United States Patent
Moran et al.

(10) Patent No.: US 9,753,622 B2
(45) Date of Patent: Sep. 5, 2017

(54) CUSTOMIZED INTERACTIVE COMPUTING ENVIRONMENT

(71) Applicants: James L. Moran, Media, PA (US);
Stephen G. Pjura, Towson, MD (US);
Bradley D. Moran, Media, PA (US);
Jesse T. Rendell, Philadelphia, PA (US)

(72) Inventors: James L. Moran, Media, PA (US);
Stephen G. Pjura, Towson, MD (US);
Bradley D. Moran, Media, PA (US);
Jesse T. Rendell, Philadelphia, PA (US)

( * ) Notice: Subject to any disclaimer, the term of this patent is extended or adjusted under 35 U.S.C. 154(b) by 301 days.

(21) Appl. No.: 14/705,830

(22) Filed: May 6, 2015

(65) Prior Publication Data

US 2016/0328121 A1 Nov. 10, 2016

(51) Int. Cl.
| | |
|---|---|
| G06F 3/00 | (2006.01) |
| G06F 3/0484 | (2013.01) |
| G06Q 30/02 | (2012.01) |
| H04L 29/08 | (2006.01) |
| G06F 3/01 | (2006.01) |

(52) U.S. Cl.
CPC ..... *G06F 3/04842* (2013.01); *G06Q 30/0226* (2013.01); *H04L 67/22* (2013.01)

(58) Field of Classification Search
CPC ......... G06Q 10/06393; G06Q 30/0226; G06Q 30/0224; G06Q 10/109; H04L 63/083; A63F 13/80
See application file for complete search history.

(56) References Cited

U.S. PATENT DOCUMENTS

| | | | | |
|---|---|---|---|---|
| 8,251,815 | B1 * | 8/2012 | Sullivan | A63F 13/80 463/31 |
| 8,851,978 | B1 * | 10/2014 | Koh | A63F 9/24 463/23 |
| 2006/0282835 | A1 * | 12/2006 | Bascom | G06Q 10/109 718/100 |
| 2011/0269540 | A1 * | 11/2011 | Gillo | A63F 13/005 463/31 |
| 2013/0017527 | A1 * | 1/2013 | Nguyen | G06Q 30/0224 434/362 |
| 2013/0346507 | A1 * | 12/2013 | Stock | H04L 67/306 709/205 |

(Continued)

*Primary Examiner* — Toan Vu
(74) *Attorney, Agent, or Firm* — Condo Roccia Koptiw LLP

(57) ABSTRACT

A customized interactive computing environment may allow for a customized interactive user experience. The interactive computing environment may be defined by session parameters to customize a session of the interactive computing environment. The session parameters may include customized interactive user objectives that may be defined by a user. Each objective may be defined with a number of points awarded to a user for completing the objective. Real-time interactive user data may be received from user devices for completion of the custom objectives. Custom profile information may be defined by a user to customize user interfaces provided to users that log into a session of the interactive computing environment. Data analysis about the session and/or the defined objectives may be generated and displayed to users to indicate progress or other data about the session.

18 Claims, 18 Drawing Sheets

(56) References Cited

U.S. PATENT DOCUMENTS

| | | | | |
|---|---|---|---|---|
| 2015/0237037 A1* | 8/2015 | Staker | ............... | H04L 63/083 |
| | | | | 726/4 |
| 2015/0363815 A1* | 12/2015 | Login | ............ | G06Q 30/0226 |
| | | | | 705/14.27 |
| 2016/0110916 A1* | 4/2016 | Eikhoff | ............... | G06T 15/60 |
| | | | | 345/420 |
| 2016/0314705 A1* | 10/2016 | Segal | ........... | G06Q 10/06393 |

* cited by examiner

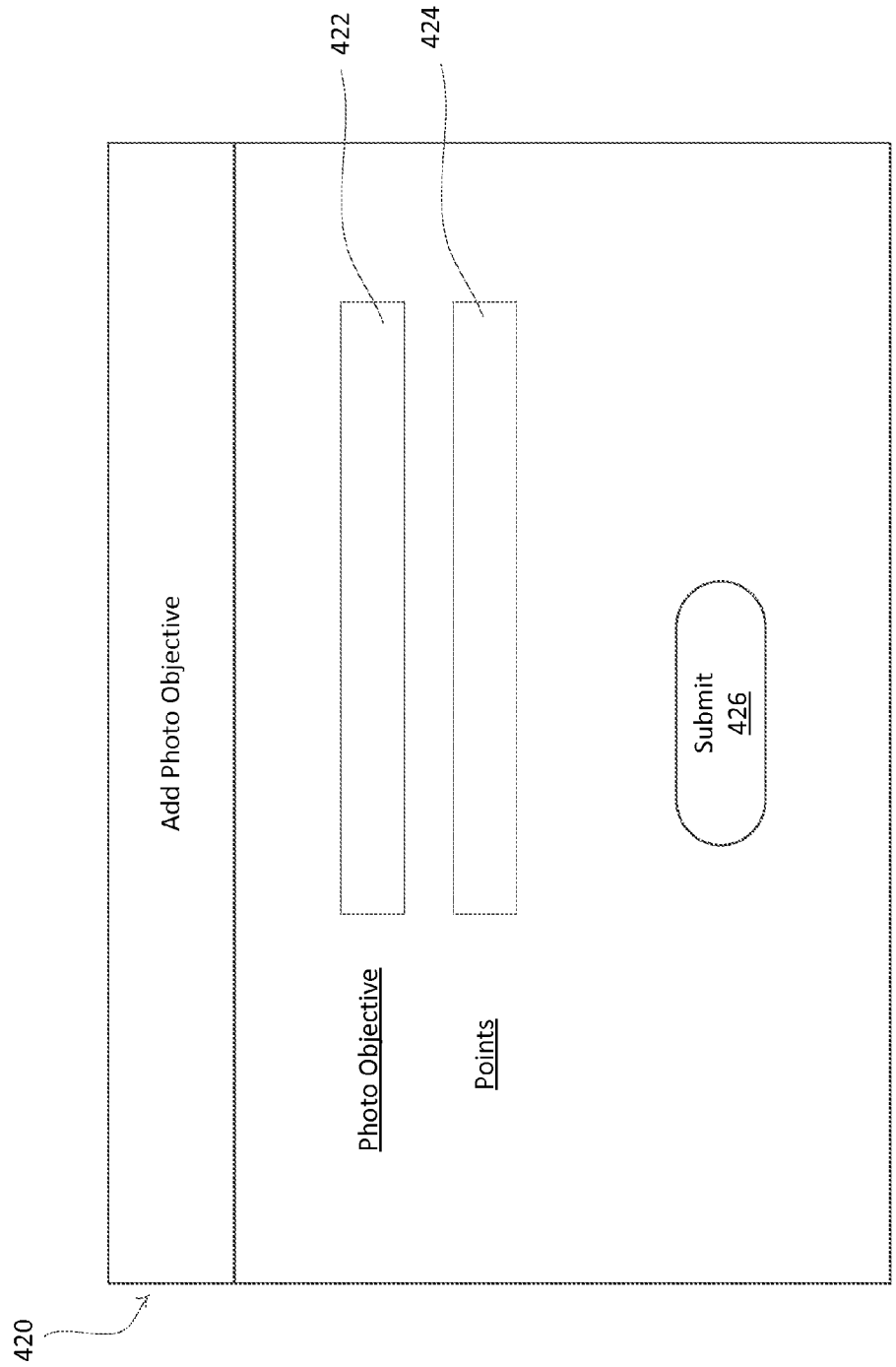

CUSTOMIZED INTERACTIVE COMPUTING ENVIRONMENT

BACKGROUND

Computing devices provide various applications and services for collecting data from users and to provide information to users. Some of these applications may be games or other entertaining applications to keep the interest of the user, while also collecting user data or providing information to the user. Many of these applications, however, are provided in a predefined format that allows little to no customization of the applications or services themselves, including the type of data collected from the users or the information being provided to the users. Other applications may provide the information in a manner that is not retained by the user, as the application is unable to keep the user's interest.

SUMMARY

Systems, methods, and apparatus are described herein for providing a customized interactive computing environment. The customized interactive computing environment may be provided to maintain the interest of users, such as in the form of a game or a contest, and collect user-interactive data. Session parameters may be defined at a computing device to customize a session of the interactive computing environment. The session parameters may be defined by a user, such as an administrative user, at a computing device. The session parameters may include customized interactive user objectives that may be defined by the user. The interactive user objectives that may include different objective types, such as photo objectives, location-based objectives, quick response (QR) code objectives, question and answer objectives, fitness-based objectives, and/or other interactive user objectives to be completed by users. Each objective may be defined with a number of points awarded to a user for completing the objective.

Custom profile information may be defined by a user, such as the administrative user, to customize user interfaces provided to users that log into a session of the interactive computing environment. The custom profile information may include a graphic or text for automatically customizing the user interfaces. The user interfaces may be generated including the custom profile information in a predefined location of the user interface. The customized user interfaces may be provided to the computing devices of the users that are logged into the interactive computing environment to enable the users to access the interactive computing environment.

Users may register and log into the session to complete the defined objectives. Real-time interactive user data may be received, via the user interfaces, from users during the session. The real-time interactive data of each user may include data submitted in response to the user objectives. For example, the real-time interactive data may include a geospatial location of the user, an answer to a question, a QR code or embedded text interpreted from scanning a QR code, a photo, fitness information, and/or a response to another objective type. The real-time interactive data may be included in a digital message that includes an objective identifier for which the real-time interactive data is being submitted. The user may be awarded a number of points allocated to the identified objective. The user's total score may be increased by the number of points awarded. The user's total score may indicate an amount of information conveyed to the user and/or an amount of real-time interactive data received from the user.

Data analysis about the session and/or the defined objectives may be generated and displayed to a user, such as an administrative user. For example, the data analysis may indicate a number of users that have logged into a session and/or completed interactive user objectives during the session. The data analysis may be provided in a graphical format.

BRIEF DESCRIPTION OF THE DRAWINGS

FIGS. 4A-4F depict example user interfaces that may be generated for defining session objectives for the interactive computing environment.

DETAILED DESCRIPTION

Figure 1:
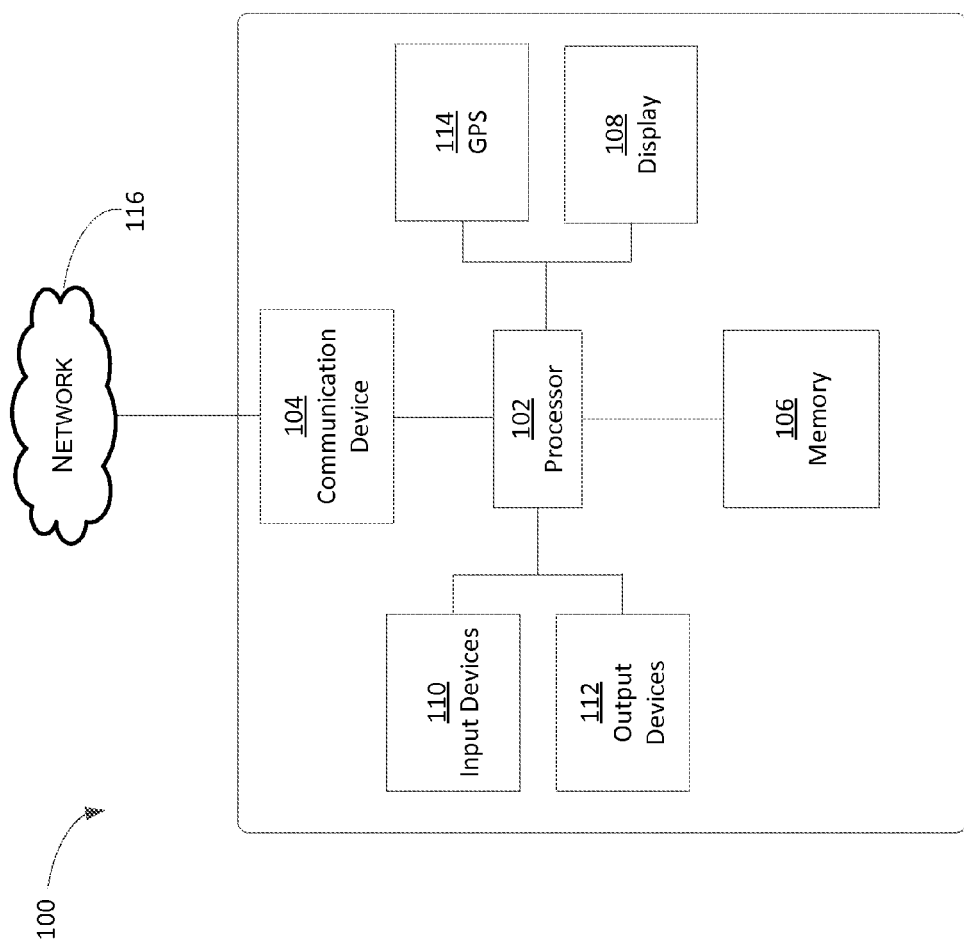
FIG. 1 illustrates a block diagram of an example computing device.

FIG. 1 illustrates a block diagram of an example computing device 100. The computing device 100 may include a personal computer, such as a laptop or desktop computer, a tablet device, a cellular phone or smartphone, a server, or another type of computing device. The computing device 100 may include a processor 102, a communication interface 104, a memory 106, a display 108, input devices 110, output devices 112, and/or a GPS circuit 114. The computing device 100 may include additional, different, or fewer components.

The processor 102 may include one or more general purpose processors, special purpose processors, conventional processors, digital signal processors (DSPs), microprocessors, integrated circuits, a programmable logic device (PLD), application specific integrated circuits (ASICs), or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The processor 102 that may communicate with other devices via the communication device 104. The communication device 104 may transmit and/or receive information over the network 116, which may include one or more other computing devices. The communication device 104 may perform wireless and/or wired communications. The communication device 104 may include an receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or communications protocol. The computing device 100 may include one or more communication devices 104.

The processor 102 may be in communication with a display 108 for providing information to a user. The information may be provided via a user interface on the display 108. The information may be provided as an image generated on the display 108. The display 108 and the processor 102 may be in two-way communication, as the display 106 may include a touch-screen device capable of receiving information from a user and providing such information to the processor 102.

The processor 102 may be in communication with a GPS circuit 114 for receiving geospatial information. The processor 102 may be capable of determining the GPS coordinates of the wireless communication device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a camera, a microphone, a keyboard or other buttons or keys, and/or other types of input devices for sending information to the processor 102. The display 108 may be a type of input device, as the display 108 may include touch-screen sensor capable of sending information to the processor 102. The output devices 112 may include speakers, indicator lights, or other output devices capable of receiving signals from the processor 102 and providing output from the computing device 100. The display 108 may be a type of output device, as the display 108 may provide images or other visual display of information received from the processor 102.

Figure 2:
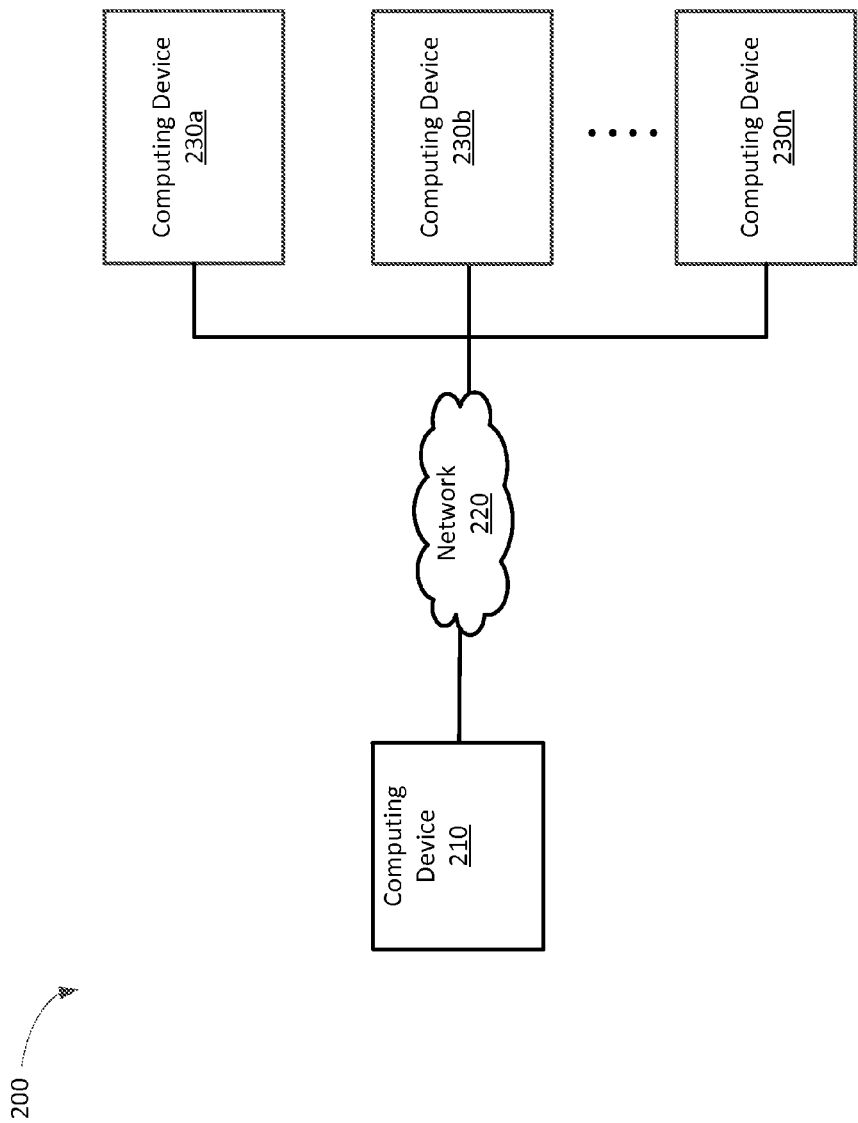
FIG. 2 illustrates a block diagram of an example computing network system.

FIG. 2 illustrates a block diagram of an example computing network system 200. The computing network system 200 may include one or more computing devices 230a-230n that may be capable of communicating digital messages with one another, either directly or via the network 220. The computing devices 230-230n may be user devices capable of logging into a session of an interactive computing environment and providing real-time interactive data via the network 220. The network 220 may include a wired and/or wireless network. For example, the network 220 may include a Wi-Fi communication network, a Wi-MAX communication network, a cellular communication network (e.g., CDMA, HSPA+, LTE, etc.), and/or a television white space (TVWS) communication network. The network 220 may include one or more communication networks.

The one or more computing devices 230a-230n may be capable of communicating digital messages to and/or receiving digital messages from the computing device 210 via the network 220. The computing device 210 may be a server, such as a web server, for providing a user interface to the computing devices 230a-230n. The computing device 210 may be in communication with an application executing locally on the computing devices 230a-230n for providing a user interface at the computing devices. The display of information may be generated locally at the computing devices 230a-230n or at the computing device 210 and provided via an application (e.g., a web browser) at the computing devices 230a-230n.

One or more of the computing devices 230a-230n may be operated by an administrative user capable of configuring sessions of an interactive computing environment that may be stored at the computing device 210. The computing device operated by the administrative user may submit credentials to the computing device 210 to allow the session to be configured. The session may be accessed by the computing devices 230a-230n via the network 220.

Figure 3:
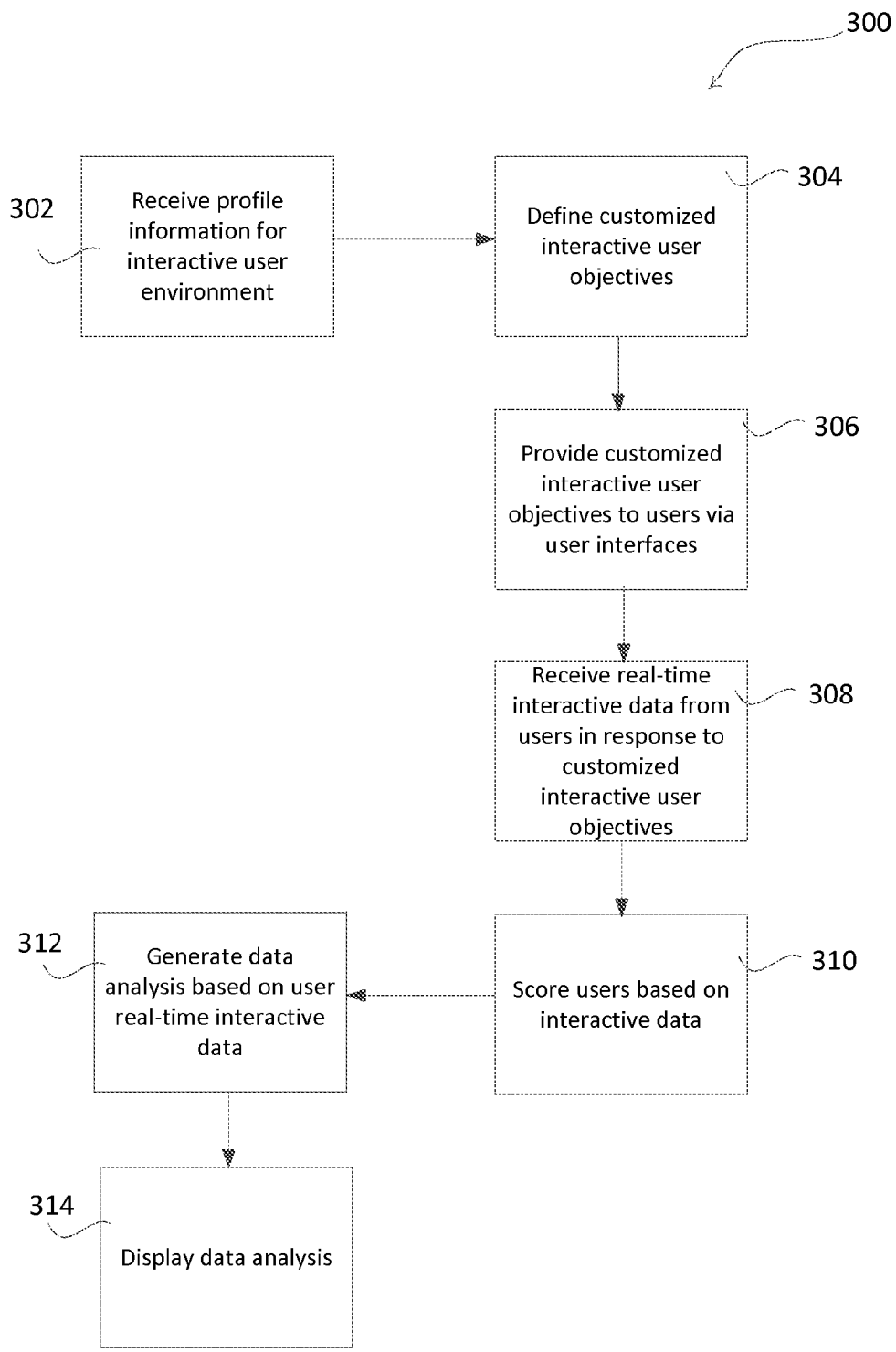
FIG. 3 is a flow diagram of an example method that may be implemented to create and/or customize an interactive computing environment.

FIG. 3 is a flow diagram of an example method 300 that may be implemented to create and/or customize a session of an interactive computing environment at a computing device. The method 300, or portions thereof, may be performed at a computing device or may be distributed across multiple computing devices (e.g., a server and a user device). The method 300, or portions thereof, may be performed to enable users, such as administrative users, to customize objectives to be performed by other users in the interactive computing environment. The method 300, or portions thereof, may be performed to collect real-time interactive data from users of the interactive computing environment and provide such data to users, such as the administrative users.

As illustrated in FIG. 3, profile information for an interactive computing environment may be received at a computing device at 302. The profile information may be received at 302 via user input or from another computing device. The profile information may be used to create a session of an interactive computing environment having the characteristics indicated in the profile information. The profile information may include a name and/or a description of a session in which the interactive computing environment may be accessed by a group of users. The profile information may include session parameters for a session that may be created within the interactive computing environment. The session parameters may include a start date, a start time, an end date, and/or an end time for which users may access the interactive computing environment. The dates and/or times may be entered by a user in a text box or a selection in a calendar display, a dropdown menu, or other form of user-selection. The session parameters may include a password that may be used to prevent unauthorized users from accessing the session. The session parameters may include a location and/or a radius from the location in which users may be located to access the session. For example, the location may be an address or a city and the search radius may limit user access to within a predefined distance from the address or city. The session parameters may restrict the session to a maximum number of users or specific users allowed to access the session. The maximum number of users may include different predefined levels of users, such as 5 users, 100 users, 500 users, 1,000, 2,500 users, 5,000 users, and/or 10,000 or more users. Each predefined level of users may be based on an access level granted to the administrative user defining the session parameters.

The session parameters may include a session type, which may indicate the type of interactive session available to users. For example, the session type may be an interactive game, such as a scavenger hunt, a race, or another contest, which may allow users to complete objectives to maintain the user's interest and may gather interactive data from the users while the users are completing the objectives. The session may be used for other interactive computing environments, such as an interactive tour, geocaching, providing a survey for users, and/or providing a test for users. The customized interactive computing environment being provided in the form of a game or other contest using a point system may maintain the interest of users through interactive objectives that may cause the users to interact with one another or objects at various locations, while providing customized information to, and soliciting real-time information from, users.

The session parameters may define the features that may be offered to the users that access the session. For example, the session parameters may define whether to allow users to view scores of other users, whether to enable social sharing of information, whether to allow photostreaming, and/or whether to allow community flagging. For example, an administrative user may enable or disable certain session features, which may be defined in the session parameters.

User scores may be shared with other users via a scoreboard that indicates the objectives completed by other users and/or the scores achieved by other users for completion of objectives. The scores may be used to indicate the rank of the users in the session, may indicate the amount of real-time interactive user data received from each user, and/or may indicate the amount of information defined in the customized user objectives that may be communicated to each user.

Social sharing of information may allow users to upload objectives, information received in response to the objectives, and/or an indication of a completion of an objective to a third-party webpage. For example, users may upload photos, locations, objectives, or other real-time data to a computing device and the computing device may upload the information to a webpage that may be viewed by others, such as a third-party URL on a social media website for example.

Photostreaming may allow a computing device to display a stream of photo objectives that have been completed to other users. The photo stream may include the photos taken by a user for each objective. The photo stream may be displayed in the sequence in which the photo objectives were completed by a user. Other users may indicate that they like a photo in a user's photo stream or comment on a photo in the photo stream. When a user is viewing a photo in the photo stream, the photo stream may include the defined description of the photo objective for which the photo was taken.

Community flagging may allow users to vote on the accuracy of a photo and/or flag the photos that they believe fail to complete a photo objective. A user may vote to flag or unflag a photo. When a predetermined number of users (e.g., a majority) flag a photo, or more votes for flagging the photo are received than the votes for unflagging the photo, the photo may be flagged. The user scores, the social sharing information, users' photo streams, and/or or community flagging information may be displayed at a computing device as a real-time response to a request from the computing device or as a real-time update that may be pushed to the computing device.

The session parameters may define the rewards for users that access the session. The reward may include a coupon, a gift card, or other reward that may be redeemed by users. The rewards may be presented as a photo, a barcode, a QR code, a link to a URL, or in another format the may be redeemable by users.

Customized interactive user objectives may be defined at 304. The interactive user objectives may be customizable by users, such as the administrative users. The interactive user objectives may be customized according to a theme. For example, the theme may be an entity-based theme, such as a company-based theme or a school-based theme, directed to providing and/or soliciting information about the entity. The administrative user may define onboarding themes having onboarding objectives, the completion of which may familiarize employees with information about the company or a particular job at a company and the administrative user may obtain information about the users that have completed particular onboarding objectives. The administrative user may define training themes having training objectives, the completion of which may familiarize employees with information to assist in performing a particular job at a company and the administrative user may obtain information about the users that have completed particular training objectives. The administrative user may define team-building themes having team-building objectives that may include multiple users to complete an objective and the administrative user may obtain information about the users that have completed particular team-building objectives. The administrative user may define school orientation themes having school orientation objectives, the completion of which may orient students with the location of useful locations on the school premises and the administrative user may obtain information about the users that have completed particular orientation objectives. The administrative user may define tourist destination themes having tourist destination objectives, the completion of which may provide an automated tour and the administrative user may obtain information about the users that have completed particular tourist destination objectives. The interactive user objectives may be otherwise targeted to provide information about and/or solicit certain information from other users. The customized interactive user objectives may be included in the session parameters.

The interactive user objectives may include different types of user objectives, such as photo objectives, location-based objectives, quick response (QR) code objectives, question and answer objectives, and/or other interactive user objectives to be completed by users. The photo objectives may be defined by a description of a photo to be taken, an actual photo, and/or a number of points to be awarded for completion of the photo objective. The location-based objectives may be defined by a description of a location, a location (e.g., an address, a city, a state, a country, GPS coordinates, proximity to a device, etc.), a defined radius or other range from the location in which a user may be located to be awarded points, and/or a number of points to be awarded for completion of the location-based objective. Question and answer objectives may be defined by a providing a question, an answer to the question, and/or a number of points to be awarded for receiving the answer to the question. The QR code objectives may be defined by a description of the QR code to be scanned or otherwise captured (e.g., by taking a photo), QR embedded text data for being converted into a QR code, and/or a number of points to be awarded for completion of the QR code objective. The embedded QR code text may be converted by a computing device into a QR code and may be stored in memory for being compared against QR codes submitted by users during a session, or for comparing the embedded data with the embedded data of QR codes submitted by users during a session.

Other interactive user objectives may include fitness-based objectives. A fitness-based objective may be defined by a description of the fitness-based objective, a speed a user may achieve to receive a number of points, and/or the number of points to be awarded for the user obtaining the defined speed. The user may have to obtain the speed for a defined period of time. The user's speed may be indicated in digital messages received from a computing device.

The fitness-based objective may be defined by a heartrate a user may achieve to receive a number of points and/or the number of points to be awarded for the user obtaining the defined heartrate. The user may have to obtain the heartrate for a defined period of time. The user's heartrate may be indicated in digital messages received from a computing device, which may be in communication with a heartrate monitor (e.g., an armband, such as a FITBIT® or a watch, a chest strap, or another device). The speed and/or heartrate may be achieved for a group of users before the defined points are awarded.

Each of the objectives may be defined with a different number of points, depending on the importance of the objective to the user defining the objective. The user may assign a greater point value to objectives that may be more difficult or of greater importance for conveying information to or obtaining information from the user. For example, if the user is defining user objectives to be performed for informing other users of a company, the objectives that will convey a greater amount of information about the company may be awarded a higher point value. Similarly, objectives that may solicit more important information from a user about their interests in a company or for advertising company products or services to the user may be given a greater number of points. Objectives that have a higher level of interaction between users may be defined with a greater number of points.

The objectives may be defined separately or together for combined objectives. The combined objectives may be defined in a sequence or such that the objectives are to be performed at the same time or within a time period. For example, points may be defined for performing a QR code objective at a location or within a radius of a location defined by a location-based objective. Though the QR code objective and the location-based objective are used as an example, any combination of objectives may similarly be combined for a defined number of points. If objectives are defined in a sequence, a prior objective may be completed prior to a subsequent objective being displayed to a user.

At 306, the customized interactive user objectives may be provided to users for being completed. For example, after a user defines the customized interactive user objectives and/or other session parameters, the user may launch a session of the interactive computing environment, which may be started at the start time and/or start date defined in the session parameters. The customized interactive user objectives may be provided to a user's computing device via a user interface when a user logs into the session. The user may select one or more of the customized interactive user objectives to provide real-time interactive data for completing the user objective. Objectives may be pushed to a user's computing device (e.g., in the form of an alert) when the user is determined to be within a predefined location or distance from a location at which the objective may be completed. The location of the objective and/or the distance from the objective may be defined in the session parameters. A computing device (e.g., a server or user device) may track the location of each user based on location information received at the computing device and may notify the user when the user is at the location or within the predefined distance. The location-based notifications may be enabled and/or disabled by a user (e.g., an administrative user) or on a per user basis. The enablement of the location-based notifications may be stored in the session parameters.

Real-time interactive data may be received from the users, at 308, in response to the customized interactive user objectives. For example, the users may submit responses to the customized interactive user objectives. The interactive data may be polled from users' computing devices or pushed from the users' computing devices in real-time upon completion.

The interactive data may be analyzed at a computing device, at 310, to determine a score for each user. Digital messages may be received from a computing device that may identify the user associated with the digital message, the objective, and/or the interactive data submitted for completing the objective. The objective may be identified by an objective identifier and/or an objective type (e.g., photo objective, location-based objective, QR code objective, question and answer objective, and/or other interactive user objective). The digital messages may include a timestamp of the time at which the digital message was generated or transmitted at a computing device. Computing devices receiving the digital messages may generate timestamps upon receipt of the digital messages to indicate the time at which the messages are received. The score for the user identified in the digital message may be increased by the number of points for the objective completed by a user.

The interactive data may be analyzed to determine whether the interactive data completes the objective. The user's score may be increased based on the user interactive data. For example, the interactive data received in a digital message may include a photo for completing a photo objective. The photo may automatically be awarded the points for the photo objective. Users may view the photos submitted by other users and may flag the photos that they believe fail to complete the objective. If a predefined number of users (e.g., a majority) flag a photo, or more users flag a photo than unflag a photo, the points for the photo objective may be removed from a user's score or may be held from being awarded. If a predefined number of users (e.g., a majority) unflag a photo, or more users unflag a photo than flag a photo, the points for the photo objective may remain for a user's score or may be awarded. The predefined number of users may be defined in the session parameters.

In another example, the photo may be compared to another photo through image analysis to compare the photos to determine whether the photo being submitted is similar to a photo stored for the photo objective. The image analysis may use pattern recognition, digital geometry, or other signal processing to identify similar patterns in each image and may award the points for the photo objective when the portions of each photo that are similar are above a predefined threshold percentage. If the photo is similar to the uploaded photo by a predefined threshold (e.g., defined in the session parameters), the user may be awarded the points for the photo.

Location-based objectives may be completed based on GPS information or other location information submitted in a digital message. The digital message from a computing device may include GPS coordinates or other geolocation, an address, a latitude and longitude, or other location information indicating a location of the computing device.

The location information may be compared to the location and/or the radius or other predefined range defined in the session parameters. If the location received in the digital message is the location and/or is within the radius or other predefined range defined in the session parameters, the user may be awarded the points. A user, such as the administrative user, may define a different number of points for different distances within the radius or other predefined range defined in the session parameters, which may also be awarded to the user based on the user's location.

Location-based objectives may be completed based on a computing devices proximity to one or more devices. For example, when a computing device comes within BLUETOOTH® range of one or more BLUETOOTH® beacons based on the proximity to the one or more beacons. The beacons may transmit an identifier to the computing device via a BLUETOOTH® signal, which the computing device may identify and may include in the real-time interactive data transmitted in a digital message to indicate the computing devices location. The computing device may also sense the computing devices distance to a beacon based on the signal strength (RSSI) and may submit the distance and/or the signal strength to determine whether the distance is within the defined radius or other range.

QR code objectives may be completed by a user scanning a QR code or taking a picture of the QR code and submitting the QR code in a digital message. The QR code may be compared to the QR code defined in the session parameters. In another example, the QR code may be interpreted into text and compared to the embedded text defined in the session parameters. If the QR code received in the digital message matches the QR code or the embedded text in the session parameters, the user may be awarded the points. The QR code may be published in one or more locations for a user to scan or photograph. The QR code being scanned or otherwise identified may indicate a location of a user, verify that a user has completed a predefined process, verify that a user has viewed some predefined information, or provide other confirmations or verifications. For example, a QR code may be displayed at the end of a video or reading materials, such as a pamphlet or an advertisement.

Upon completion of the scanning of a QR code or a QR code objective, a computing device may display additional information to the user on the computing device. For example, the computing device may display a web browser and a particular URL embedded in the QR code. Upon the completion of the scanning of a QR code or a QR code objective at a particular destination (e.g., a tourist destination exhibit, a historical site, a building location, etc.), the computing device may retrieve (e.g., from the server) information about the particular destination at which the QR code is scanned or the objective is completed. An indication of whether the objective is completed may be determined locally or at a remote device (e.g., a server).

Question and answer objectives may be completed by a user submitting a digital message with an answer to the question of an identified question and answer objective. The answer may be compared by the computing device to the stored answer for the identified objective. If the answer received in the digital message matches the answer defined in the session parameters, the user may be awarded the points.

Referring again to FIG. 3, data analysis may be generated at 312 based on the real-time interactive data received from the computing devices of the users in the session. The data analysis may be provided to certain users, such as administrative users that define the session parameters for example. The digital messages may include registration information from users registering to a session, login information for users that are logged in to a session for actively participating in the session, and/or real-time interactive data from users participating in the session. The data analysis may indicate a number of users that have registered or are logged in to a session of a user environment based on the registration or login information. For example, the data analysis may indicate a number of users that have registered for a session of the interactive computing environment, a number of users that have registered for a session of the interactive computing environment during one or more predefined periods of time (e.g., days, weeks, months, etc.), a number of users logged into a session at a given time, an average number of active users that are currently logged in and participating in a session, and/or a number of users that have logged into a session over a period of time or one or more predefined periods of time (e.g., days, weeks, months, etc.). The periods of time may be based on the timestamps generated at a transmitting or a receiving device.

The data analysis may indicate objective completion information for the defined objectives, or one or more types of defined objectives, for a session. For example, the data analysis may indicate a number of users that have completed the defined objectives, a number of users that have completed a predefined number of objectives (e.g., at least one objective), an average number or percentage of objectives completed per user for the users that have registered for a session or that are logged into a session, an average number or percentage of objectives completed by the active users that are currently logged in and participating in a session, a number of objectives completed during the session at predefined periods of time, a number of objectives for each objective type that have been completed during the session, a period of time that has elapsed since the last objective was completed during the session, and/or the number of completed objectives for each objective type. The data analysis may identify the user device types for the registered users and/or users that are currently logged into a session. The data analysis, or one or more portions thereof, may be displayed at a computing device (e.g., to an administrative user).

Figure 4A:
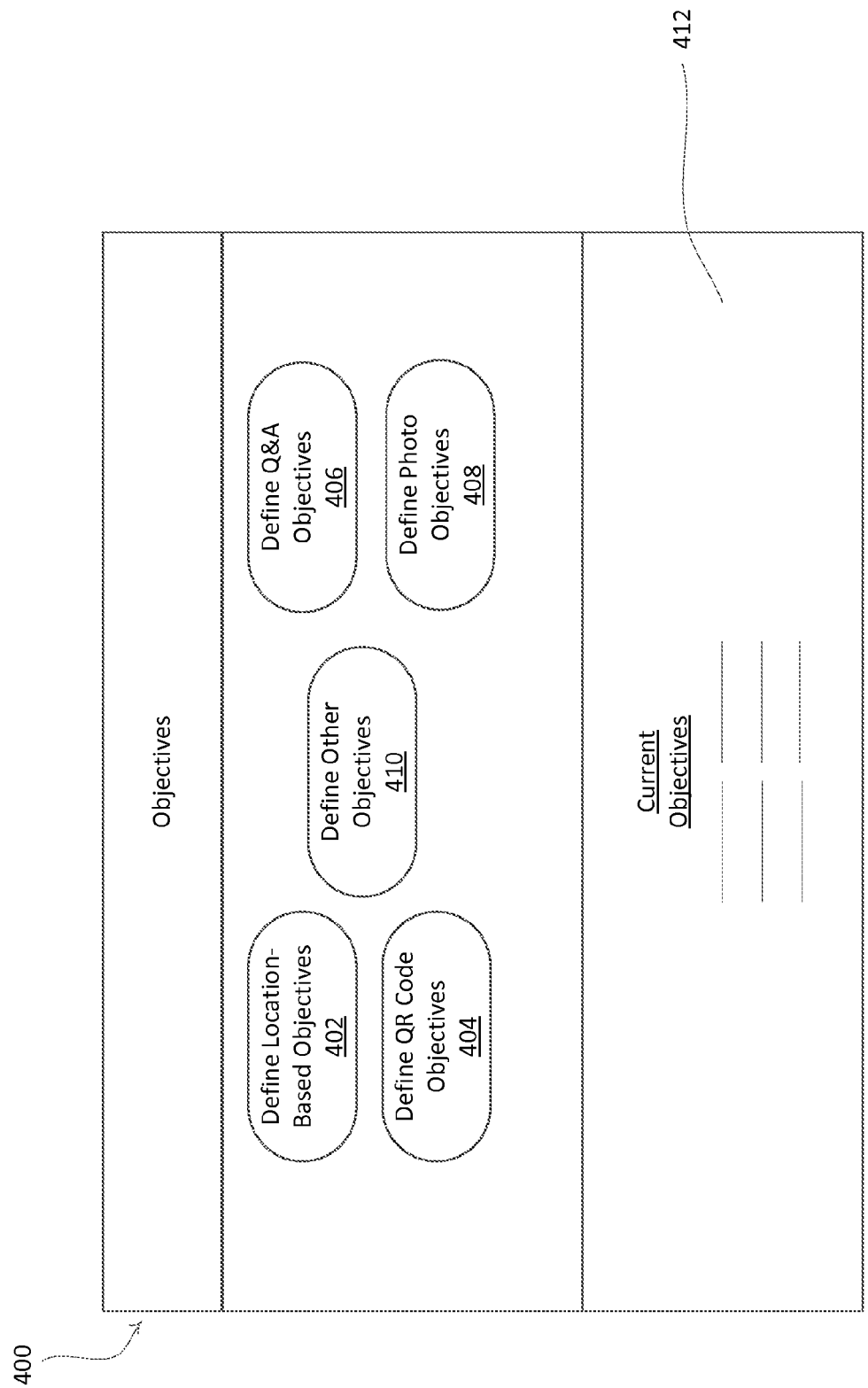

FIGS. 4A-4F depict example user interfaces that may be generated at a computing device for defining session objectives for the interactive computing environment. As shown in FIG. 4A, a user interface 400 may be generated for defining different objectives by a user, such as an administrative user, by selecting buttons 402-410 that each correspond to a different objectives to be defined by the user. The button 402 may allow a user to define location-based user objectives, button 404 may allow a user to define QR code objectives, button 406 may allow a user to define question and answer objectives, button 408 may allow a user to define photo objectives, and/or button 410 may allow a user to define other objectives. More or less buttons may be provided to allow a user to define different numbers of objectives. The defined objectives may be listed in a current objectives pane 412 in the user interface 400. The current objectives pane 412 may list one or more portions of the information used to define the objective, such as the description, the points awarded for completion of the objective, and/or the like.

FIG. 4B depicts an example user interface 420 that may be generated at a computing device for defining a photo objective. As shown in FIG. 4B, the photo objective may be defined by providing a description 422 of a photo to be taken by a user and/or a number of points 424 that may be awarded to a user for taking the photo. The description 422 of the photo objective may be a name or other description of a photo to be submitted to complete the photo objective. A user may submit the defined photo objective for being stored at a computing device by selecting the submit button 426. The computing device may store the photo objective description 422 as text. The computing device may store the photo objective points 424 as text or an integer.

Figure 4C:
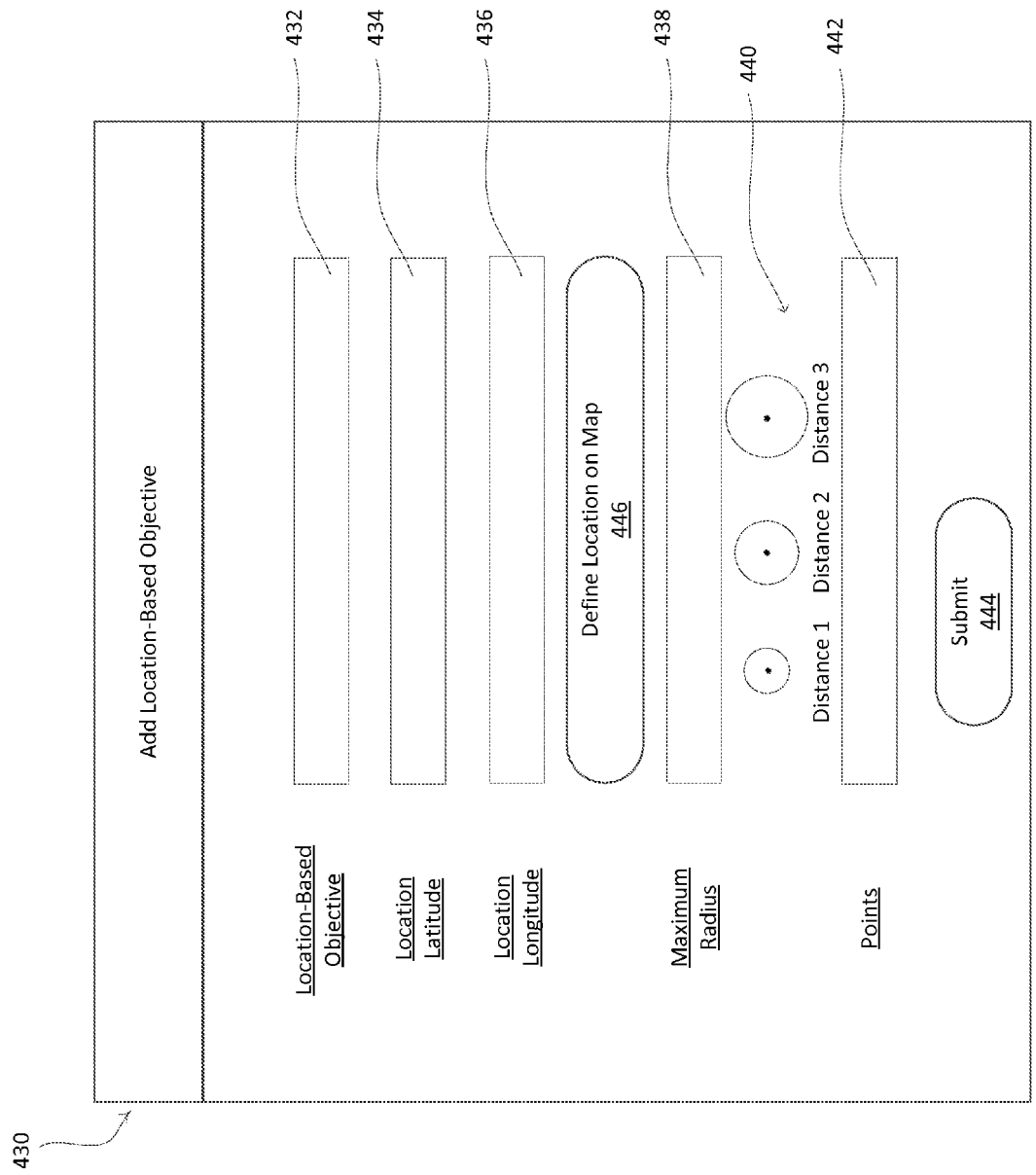

FIG. 4C depicts an example user interface 430 that may be generated at a computing device for defining a location-based objective. As shown in FIG. 4C, the location-based objective may be defined by providing a description 432 of a location, the location, a radius or other range from the defined location 438, and/or a number of points 442 that may be awarded to a user for reaching the location or coming within the defined radius 438 or other range. The description 432 of the location-based objective may be a name or other description of a location (e.g., a city, a state, a country, a building, a room in a building, an intersection, a street address, a latitude and longitude, etc.). The location may be defined by a location latitude 434 and a location longitude 436, a street address, or another predefined location type (e.g., a city, a state, a country, a building, a room in a building, an intersection, etc.). The latitude 434 and longitude 436 may be identified in a textbox, a dropdown menu of latitudes and longitudes, or another form of selection.

The radius 438 may be a maximum radius or range from the defined location within which a user may be awarded points if the user is determined to be within the radius 438. The radius 438 may be entered in a textbox, selected from a dropdown menu of predefined radii, or by selecting one of the predefined radius icons 440. Each of the predefined radii or predefined radius icons 440 may correspond to a different predefined distance based on the type of location being defined. For example, the predefined radii may be defined as an increasing number of feet when the location is within a building or a street address. If the location is defined as a city or state, the predefined radii may be an increasing number of miles. A different number of points 442 may be defined for a different radius or other range from the defined location, such that users that are closer to the defined location may be awarded more points than users that are further from the location.

Though not shown in FIG. 4C, the user interface 430 may allow users to define an amount of time a user may be at the location or within the radius to be awarded the points and/or a timeframe within which a user may be awarded the points 442 for being at the location or within the radius. A user may submit the defined location-based objective for being stored at a computing device by selecting the submit button 444. The computing device may store the location-based objective information as text. The computing device may store the location-based objective points 442 as text or an integer.

Figure 4D:
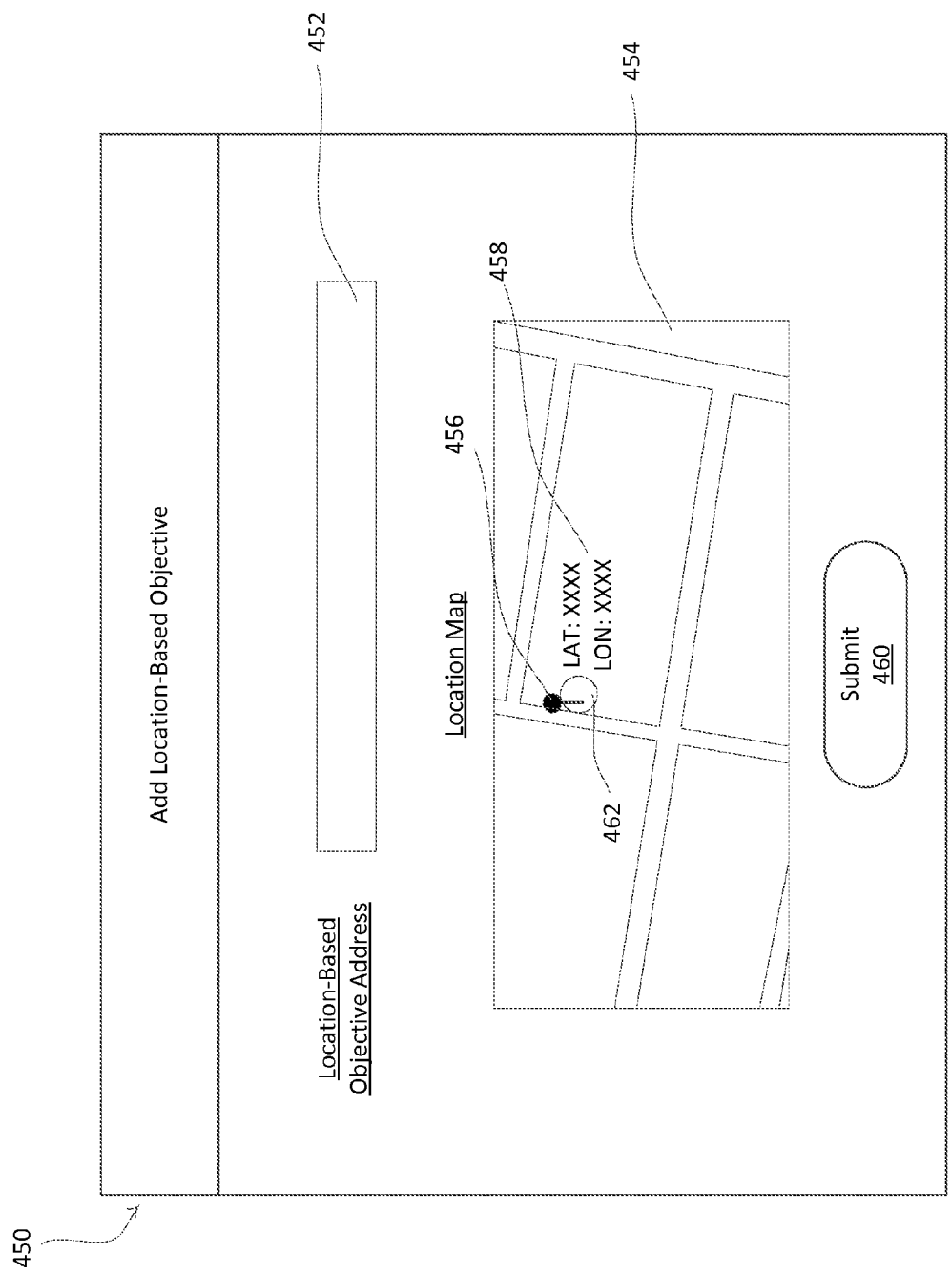

The user may further define the location of the location-based objective on a graphical map by selecting the button 446. FIG. 4D is an example user interface 450 that may be generated at a computing device for defining a location on a graphical map 454, such as when the button 446 is selected in the user interface 430 in FIG. 4C. The graphical map 454 may also, or alternatively, be displayed on the user interface 430 in FIG. 4C for defining the location. As shown in FIG. 4D, the location may be defined by a user selection on the graphical map 454. A location pin 456 may identify a user selection on the graphical map 454. The computing device may determine the latitude and longitude 458 of the location pin 456 and may use the latitude and longitude 458 as the defined location upon the user selection of the submit button 460. The location pin 456 may similarly identify another location type, such as a street address, an intersection, a city, a state, a country, a building, a room in a building, and/or the like, that may define the location of the location-based objective. The graphical map 454 may display the latitude and longitude 458, or other definition of the location, identified by the location pin 456. The graphical map may display points of interest, such as a point of interest 462, that a user may be looking for to identify as a location-based objective. The points of interest may include buildings, such as restaurants, schools, or other businesses, landmarks, historical sites, or other points of interest that a user may be looking to identify as a location-based objective.

The graphical map 454 may display a predefined area near a location-based objective address 452 that may be entered by a user. The predefined area and the information displayed on the graphical map 454 may change as a user zooms in or out, or moves in a given direction, on the graphical map 454. The location-based objective address 452 may be used to navigate to different addresses, cities, states, countries, or the like that the user may wish to view in the graphical map 454 for selecting a defined location. The location pin 456 may be initially placed at the location-based objective address 452 and may be placed in other locations in the graphical map 454 upon user selection. The user may select the submit button 460 to submit the defined location for being stored at the computing device.

Figure 4E:
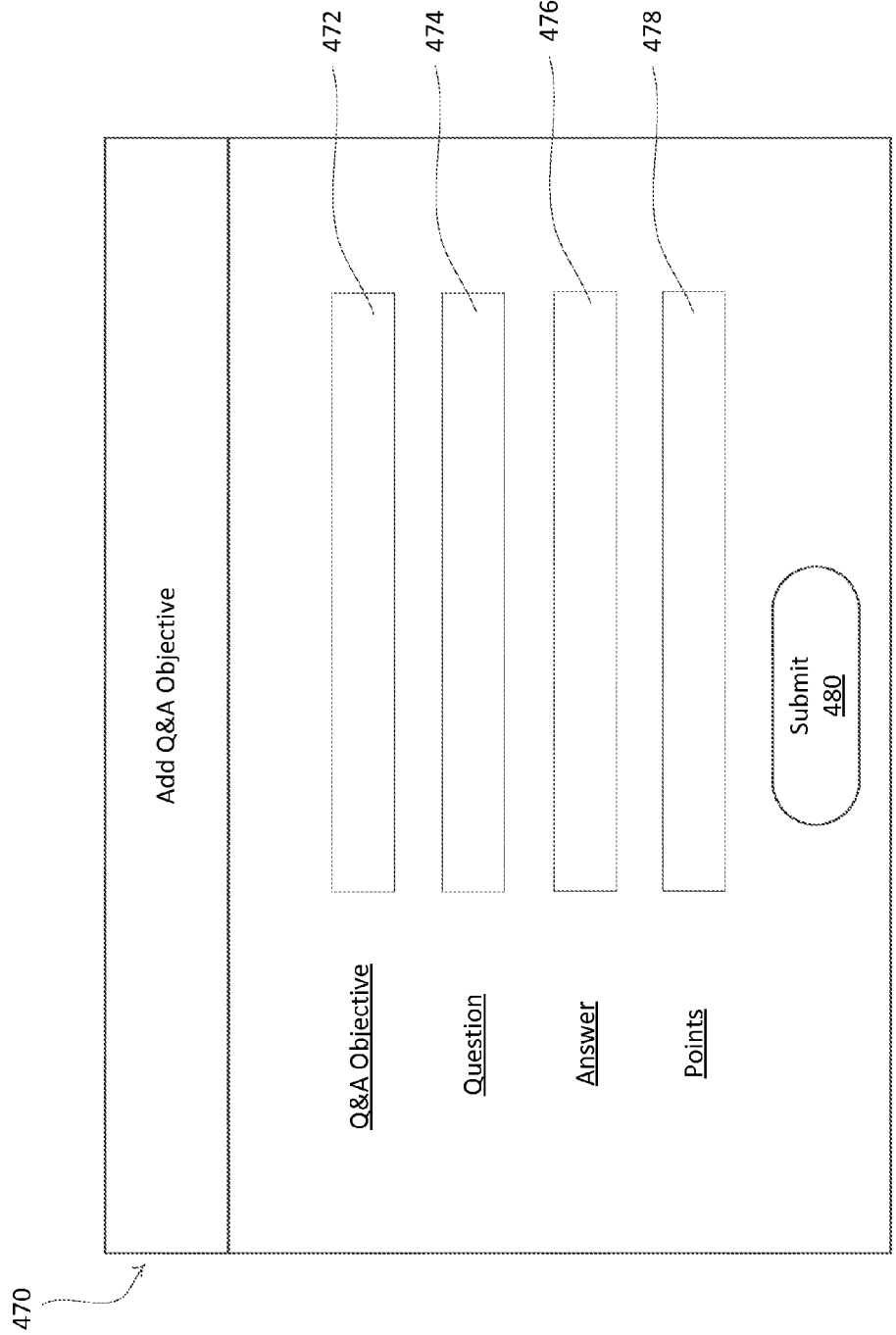

FIG. 4E depicts an example user interface 470 that may be generated at a computing device for defining a question and answer objective. As shown in FIG. 4E, the question and answer objective may be defined by providing a description 472 of a question to be answered by a user, a question 474, an answer 476 to the question 474, and/or a number of points 478 that may be awarded to a user for providing the answer 476. The description 472 of the question and answer objective may be a name, category, a clue, or other description of the answer 476 to be submitted to complete the question and answer objective. A user may submit the defined question and answer objective for being stored at a computing device by selecting the submit button 480. The computing device may store the description 472, the question 474, and/or the answer 476 as text. The computing device may store the question and answer objective points 478 as text or an integer.

Figure 4F:
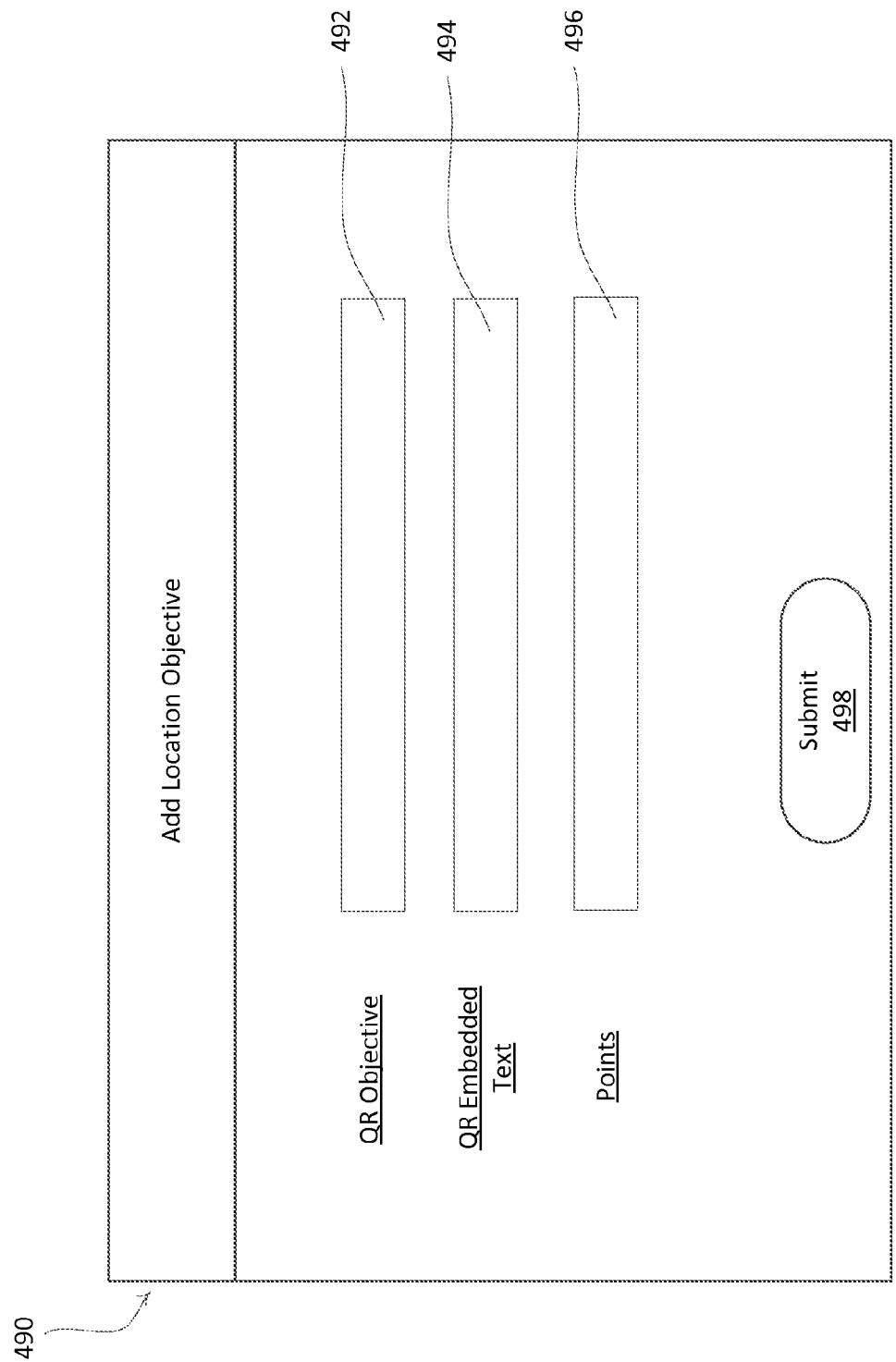

FIG. 4F depicts an example user interface 490 that may be generated at a computing device for defining a QR code objective. As shown in FIG. 4F, the QR code objective may be defined by providing a description 492 of a QR code to be scanned in or otherwise captured by a user (e.g., by taking a photo), a QR code embedded text 494, and/or a number of points 496 that may be awarded to a user for providing a QR code or scanning in a QR code corresponding to the embedded text 494. The description 492 of the QR code objective may be a name or other description (e.g., location, document, etc.) of the QR code to be submitted or scanned in by a user. The QR code embedded text 494 may be a URL, a business name, an identifier and/or password, or other text that may be embedded in a QR code. The embedded QR code text may be converted by a computing device into a QR code and may be stored in memory for being compared against QR codes submitted by users during a session. The QR code embedded text may be stored for being compared with text in a digital message that may be submitted by a computing device after scanning a QR code and interpreting the QR code embedded text. If the QR code text is a URL, a user that scans the QR code may be automatically taken to the URL in a web browser upon scanning the QR code at a computing device during a session. Other information may also be displayed on a computing device upon scanning a QR code or completion of the QR code objective. A user may submit the defined QR code objective for being stored at a computing device by selecting the submit button 498. The computing device may store the description 492 and/or the QR code embedded text 494 as text. The computing device may store the QR code objective points 496 as text or an integer.

After a session has been customized by defining the session parameters, a user may store the session parameters for launching the session at the session start time and/or date. A stored session may be searched for by users. Users may search for the session by the profile information for the session, such the name and/or a description of the session, the start date of the session, the start time of the session, the end date of the session, the end time of the session, the location of the session or a portion thereof, the session type, or any other information defined in the profile information or session parameters characterizing the session. Sessions may be displayed in the users' search results when the users are in the location or the radius from the location defined in the profile information for accessing the session. Sessions may be displayed in a user's search results when the user is identified in the session parameters as a specific user allowed to access the session.

Users that find a session in a search may register for and/or log into the session for completing the defined objectives. The users that are logged into the session may view a list of the objectives. The list of objectives may identify the objectives to be completed, the objective types for each objective, and/or the number of points awarded to the user for the completion of each objective. The list of objectives may also identify the objectives that have been completed, the objective types for each objective, and/or the number of points awarded to the user for the completion of each objective. The objectives may be completed by the user submitting a digital message from the user's computing device that includes a user identifier that identifies the user submitting the message, a session identifier that identifies the session for which the message is submitted, an objective identifier that identifies the objective for which the message is submitted, and/or real-time interactive data submitted for completing the objective. The real-time interactive data may be analyzed at a computing device to determine whether to award the points to the user. Data analysis may be tracked for the user activity and the data analysis may be provided to the user that defined the session parameters (e.g., an administrative user).

FIGS. 5A-5D depict example user interfaces that may be generated at a computing device for displaying data analysis. The data analysis may be generated based on digital messages received from users during a session of the interactive computing environment. The digital messages may include registration information from users registering to a session, login information for users that are logged in to a session for actively participating in the session, and/or real-time interactive data from users participating in the session. The data analysis may indicate a number of users that have registered for or are logged in to a session of a user environment based on the registration or login information. The data analysis may indicate objective completion information for the defined objectives, or one or more types of defined objectives, for a session based on the real-time interactive data. Each user may have a user identifier included in each digital message transmitted that includes the real-time interactive data that may be used to track the information associated with each user. Each objective and/or objective type may have an identifier to be used to track the objective completion information.

Figure 5A:
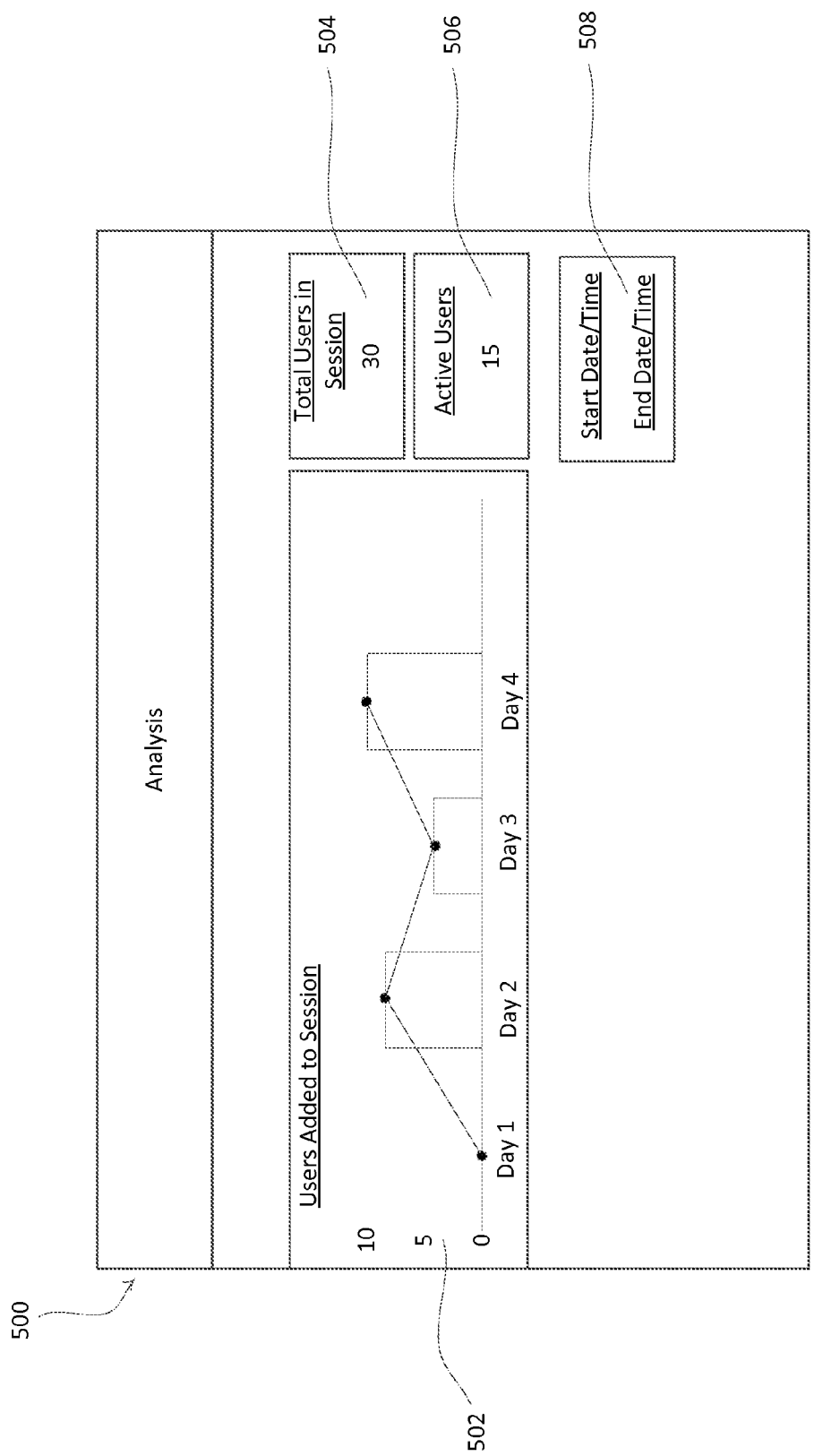
FIGS. 5A-5D depict example user interfaces that may be generated for displaying data analysis.

FIG. 5A depicts an example user interface 500 that may be generated for displaying data analysis at a computing device. As shown in FIG. 5A, the data analysis may include a graph 502 that may identify a number of users that have registered for a session during predefined periods of time. The number of users in the graph 502 may be determined by calculating the number of users indicated in the registration information as registering for the session during predefined periods of time. Though the predefined periods of time shown in the graph 502 include a number of days, the predefined periods of time may include any period of time (e.g., number of weeks, number of months, etc.). The predefined periods of time shown in the graph 502 may begin at the start date and/or start time of the session or at another time identified by the user. The data analysis in the user interface 500 may identify a total number of users 504 that have registered for a session. The number of users 504 may be determined by calculating the total number of users indicated in the registration information as registering for the session. The data analysis may identify a total number of active users 506 that are presently logged into a session. The data analysis may identify the start date, the start time, the end date, and/or the end time 508 for the session.

Figure 5B:
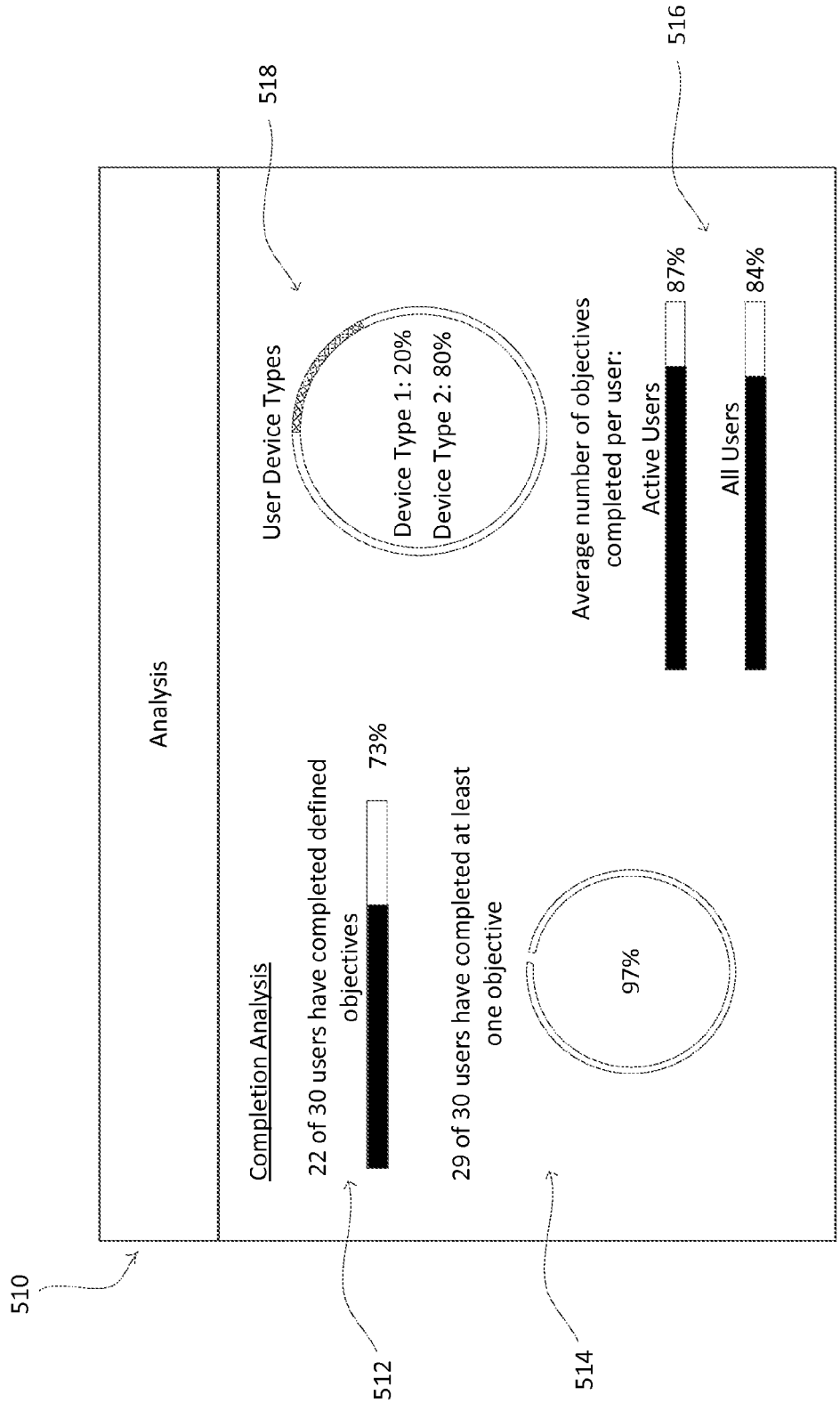

FIG. 5B depicts another example user interface 510 that may be generated for displaying data analysis at a computing device. As shown in FIG. 5B, the data analysis may identify a number of users 512 that have completed the defined objectives for the session. The number of users 512 may be calculated by determining, for each user, whether the user has completed each of the objectives defined in the session. The computing device may keep a running count of the number of objectives completed by each user and may set a flag when the user has completed each of the objectives. As shown in FIG. 5B, the number of users 512 that have completed the defined objectives for the session may be represented as a percentage and/or in a graph.

The data analysis provided in the user interface 510 may identify a number of users 514 that have completed a predefined number of objectives for the session. Though the user interface 510 identifies a number of users 514 that have completed at least one objective, any number of predefined objectives may be identified in the user interface 510. The number of users 510 may be calculated by determining, for each user, whether the user has completed the predefined number of objectives defined in the session. The computing device may keep a running count of the number of users that have completed the predefined number of objectives and may set a flag when the user has completed the predetermined number of the objectives. As shown in FIG. 5B, the number of users 514 that have completed the predefined number of objectives for the session may be represented as a percentage and/or in a graph. The graph identifying the number of users 512 that have completed the defined objectives for the session is depicted as a horizontal bar graph and the graph identifying the number of users 514 that have completed a predefined number of objectives for the session is depicted as a circular bar graph, but either graph, or any other type of graph, may be used in any of the user interfaces described herein.

The data analysis provided in the user interface 510 may identify an average number of objectives 516 that have been completed per user during the session. The user interface 510 identifies the average number of objectives completed per user for both the active users that are currently logged into the session and the total users registered in the session.

Each of the portions of the data analysis may be provided for active users and/or registered users. The number of users 516 may be calculated by determining, for each user, the number of objectives completed during the session. As shown in FIG. 5B, the number of users 516 that have completed the predefined number of objectives for the session may be represented as a percentage and/or in a graph. The number of users 516 may be calculated for each objective type (e.g., photo objective, location-based objective, QR code objective, question and answer objective, etc.).

The data analysis provided in the user interface 510 may identify the user device types 518 for the registered users and/or users that are currently logged into a session. The user device types 518 may be calculated by determining, for each user, the type of devices being implemented by the user. The types of devices may include devices having different software components, such as different operating systems (e.g., APPLE®, MICROSOFT®, ANDROID®, etc.), and/or different hardware components (e.g., laptops, cell phones or smartphones, tablets, etc.). As shown in FIG. 5B, the user device types 518 may be represented as a percentage and/or in a graph. The device type may be determined automatically from the digital messages generated at a computing device. The device type may be indicated in, and determined from, the coding in the digital messages transmitted from a computing device. The device type may be determined based on digital messages received that include registration information for registering a user in a session.

Figure 5C:
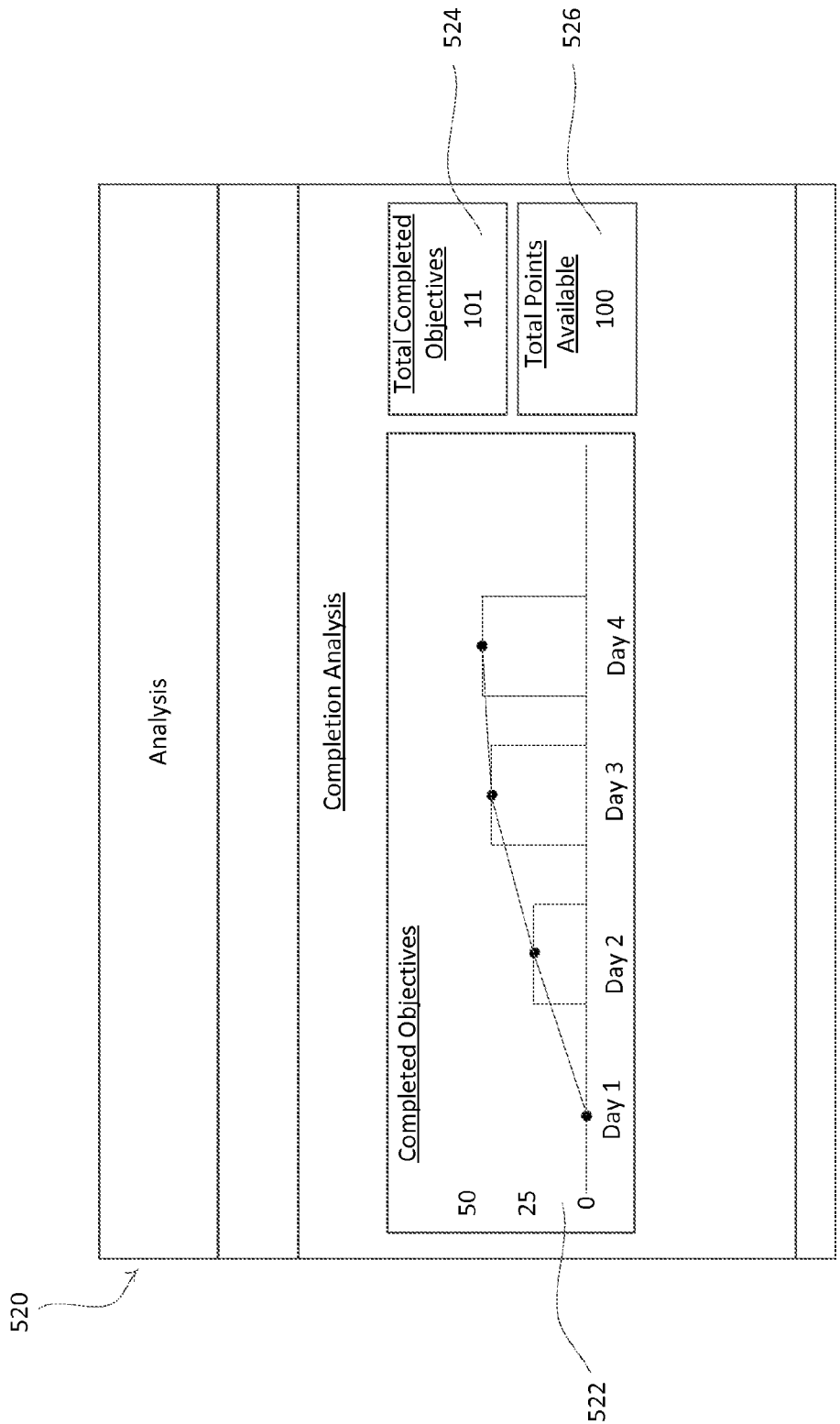

FIG. 5C depicts another example user interface 520 that may be generated for displaying data analysis at a computing device. As shown in FIG. 5C, the data analysis may include a graph 522 that may identify a number of objectives completed during the session at predefined periods of time. The number of objectives identified in the graph 522 may be determined by calculating the number of objectives identified in the real-time interactive data as being completed during the session at each of the predefined periods of time. Though the predefined periods of time shown in the graph 522 include a number of days, the predefined periods of time may include any period of time (e.g., number of weeks, number of months, etc.). The predefined periods of time shown in the graph 502 may begin at the start date and/or start time of the session or at another time identified by the user. Each predefined period of time shown in the graph 502 may be calculated according to timestamps generated at transmitting devices and/or receiving devices. The data analysis in the user interface 520 may identify a total number of completed objectives 524. The number of completed objectives 524 may be determined by calculating the total number of objectives determined to be completed by the users based on the real-time interactive data received in the digital messages during the session. The data analysis may identify a total number of available points 526 that are available for each user during a session. The total number of available points 526 may be determined by calculating the total points available for each defined objective.

Figure 5D:
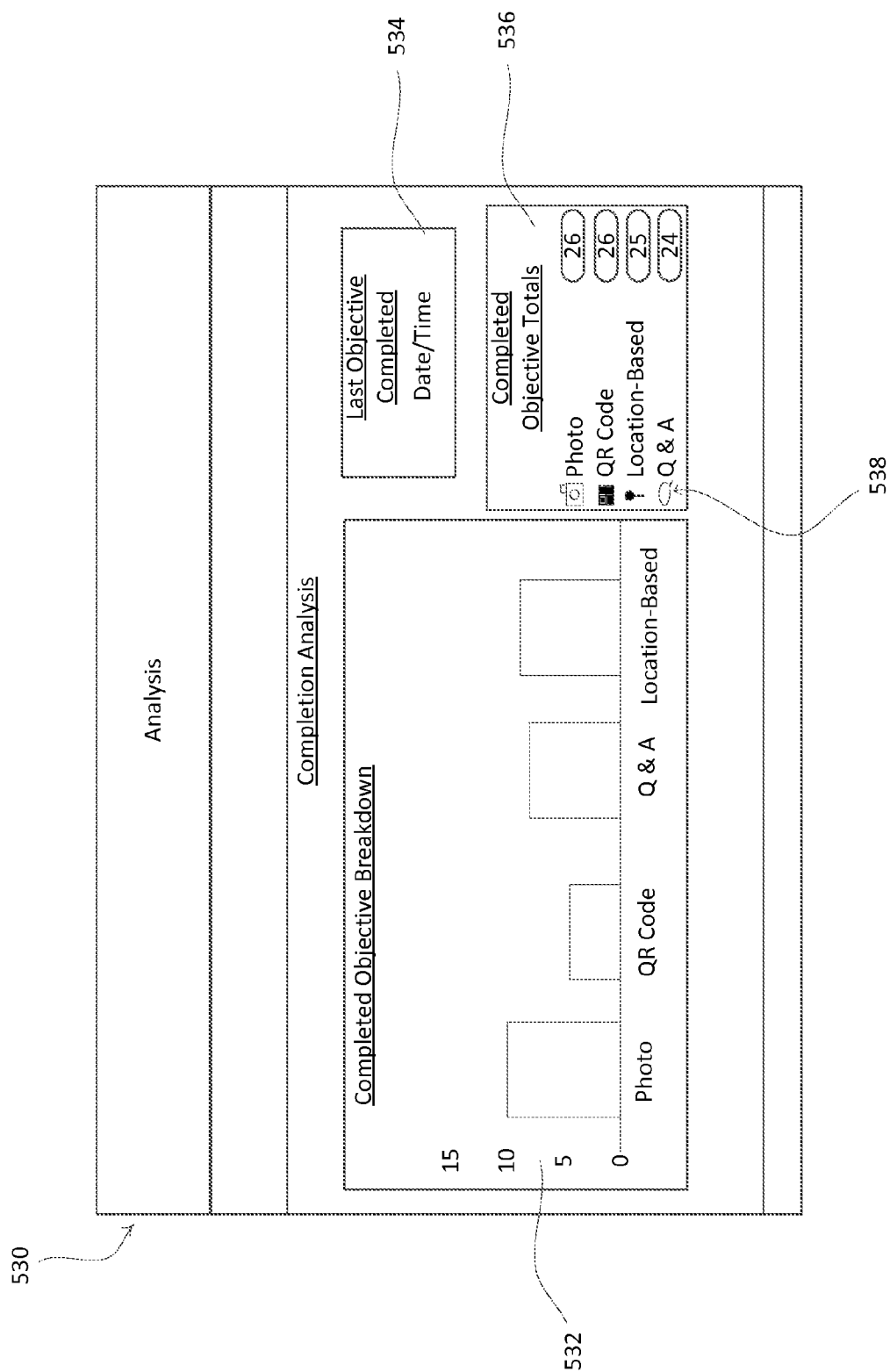

FIG. 5D depicts another example user interface 530 that may be generated for displaying data analysis at a computing device. As shown in FIG. 5D, the data analysis may include a graph 532 that may identify a number of objectives for each objective type that have been completed during the session. The number of objectives identified in the graph 532 for each objective type may be identified by calculating the number of objectives in the real-time interactive data that have been completed during the session having an objective identifier that corresponds to the objective type. Each objective type may be identified in the graph 532 using a different color, texture, icon, or other corresponding identifier. The data analysis in the user interface 530 may indicate a period of time 534 that has elapsed since the last objective was completed during the session. The period of time 534 may be indicated by displaying a date and/or time the last objective was completed. In another example, the period of time may be determined as an amount of time since the date or time since the last objective was completed and may be displayed.

The data analysis in the user interface 530 may include the number of completed objectives 536 for each objective type. The number of completed objectives 536 for each objective type may be determined by calculating the total number of objectives determined to be completed by the users based on the real-time interactive data that have the objective type identifier, which may be identified in the digital messages including the real-time interactive data. The number of completed objectives 536 for each objective type may be identified by a percentage and/or a graph.

Different objective types may be differentiated using different objective type icons 538. Each of the objective type icons 538 may include a photo or other symbol that is descriptive of the objective type. For example, the photo objective type may have an objective type icon 538 that is a camera or photo. The QR code objective type may have an objective type icon 538 that is a QR code. The location-based objective type may have an objective type icon 538 that is a location pin or a map. The question and answer objective type may have an objective type icon 538 that is a comment bubble. The objective type icons 538 and/or other objective type information may be differentiated by color, texture, or other differentiator. The objective type icons 538 may be uploaded or selected by a user, such as an administrative user, when defining the objectives in the session parameters. The objective type icons 538 may be provided in other user interfaces provided to a user when the objective type or objective is being displayed. Though the data analysis in FIGS. 5A-5D may be shown on different user interfaces, the data analysis may be displayed on the same user interface, or different combinations of user interfaces.

Other information may be provided as data analysis. For example, the data analysis generated at a computing device that includes a graphical map that tracks the location of one or more users as the users completed one or more objectives during a session, or a selected portion of a session. The graphical map may allow a user, such as an administrative user, to select an objective and view a graphical map that illustrates the path of one or more users as the users completed the objective. The path on the map may be generated based on the location information received from user devices and the timestamp of the digital messages received from the user devices.

Figure 6:
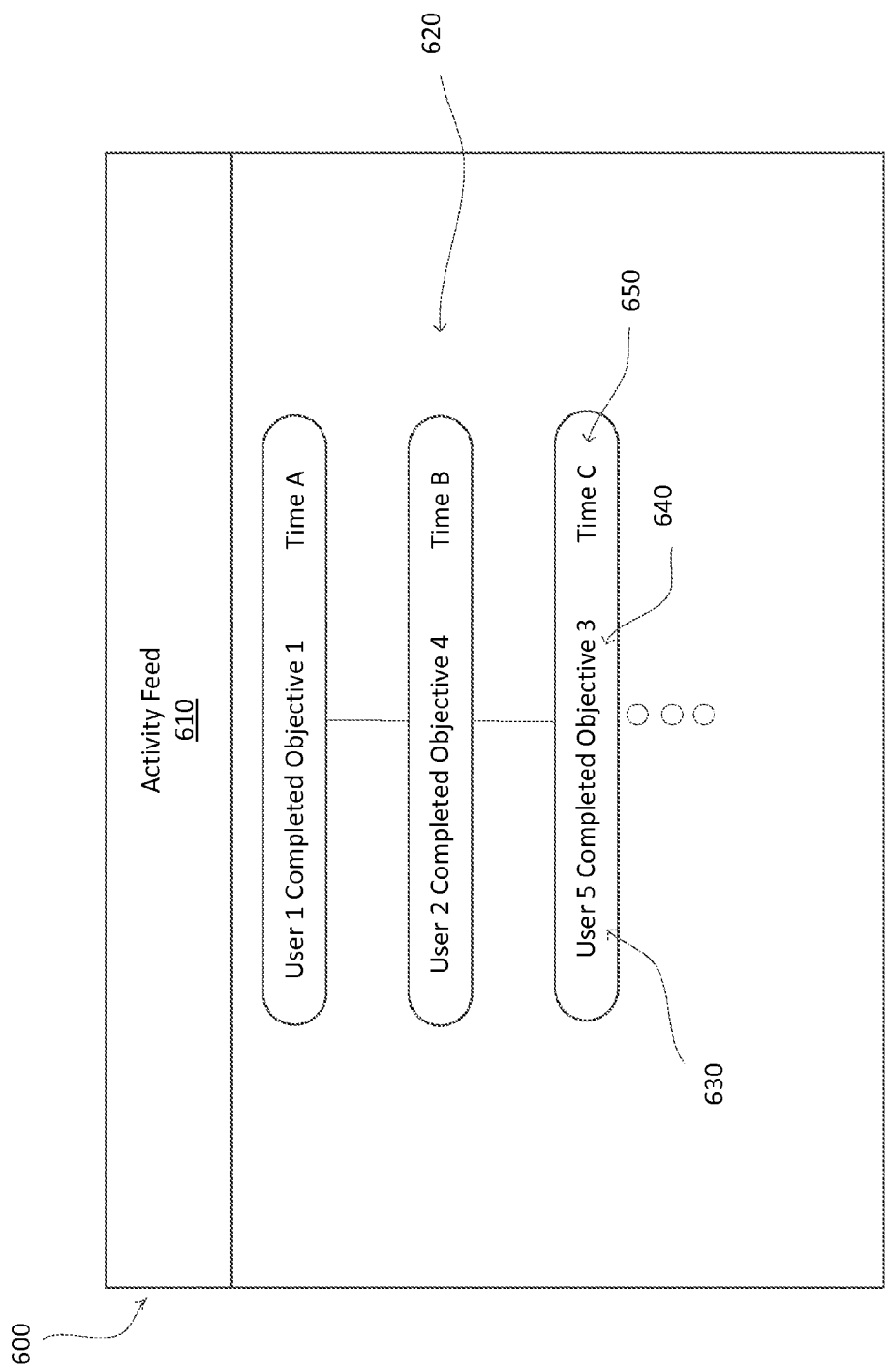
FIG. 6 depicts another example user interface that may be generated for displaying data analysis.

FIG. 6 depicts another example user interface 600 that may be generated for displaying data analysis at a computing device. The data analysis may be generated based on digital messages received from users during a session of the interactive computing environment. The data analysis shown in FIG. 6 is displayed in the form of an activity feed 610. The activity feed 610 may be displayed in the user interface 600 to administrative users that define the session parameters and/or other users that may be logged into the session. The activity feed 610 may include a timeline 620 of objectives completed by users during a session. The timeline 620 may include a sequence of completed objectives during the session, a predefined portion of the session, a user-defined portion of the session, or for a predefined number of entries in the session. The time 650 may identify the time in the timestamp in the digital message or the timestamp generated at the computing device in response to the digital message.

Each entry in the timeline may include a user 630, an objective 640 completed by the user 630, and/or a time 650 at which the objective 640 was completed. The user 630 may be determined from the user identifier in the digital messages received in the real-time interactive data. The objective 640 may be determined from the objective identifier in the digital messages received in the real-time interactive data. The objective 640 may include an identifier of the objective type, such as the objective type name, identifier, symbol, color, texture, and/or other differentiator.

The entries in the timeline may include the real-time interactive data submitted by the user 630 to complete the objective 640. For example, an entry for a photo objective may include the photo submitted by the user 630. An entry for a QR code objective may include the QR code submitted by the user 630. An entry for a location-based objective may include the location of the user 630. An entry for a question and answer objective may include the answer submitted by the user 630.

Figure 7:
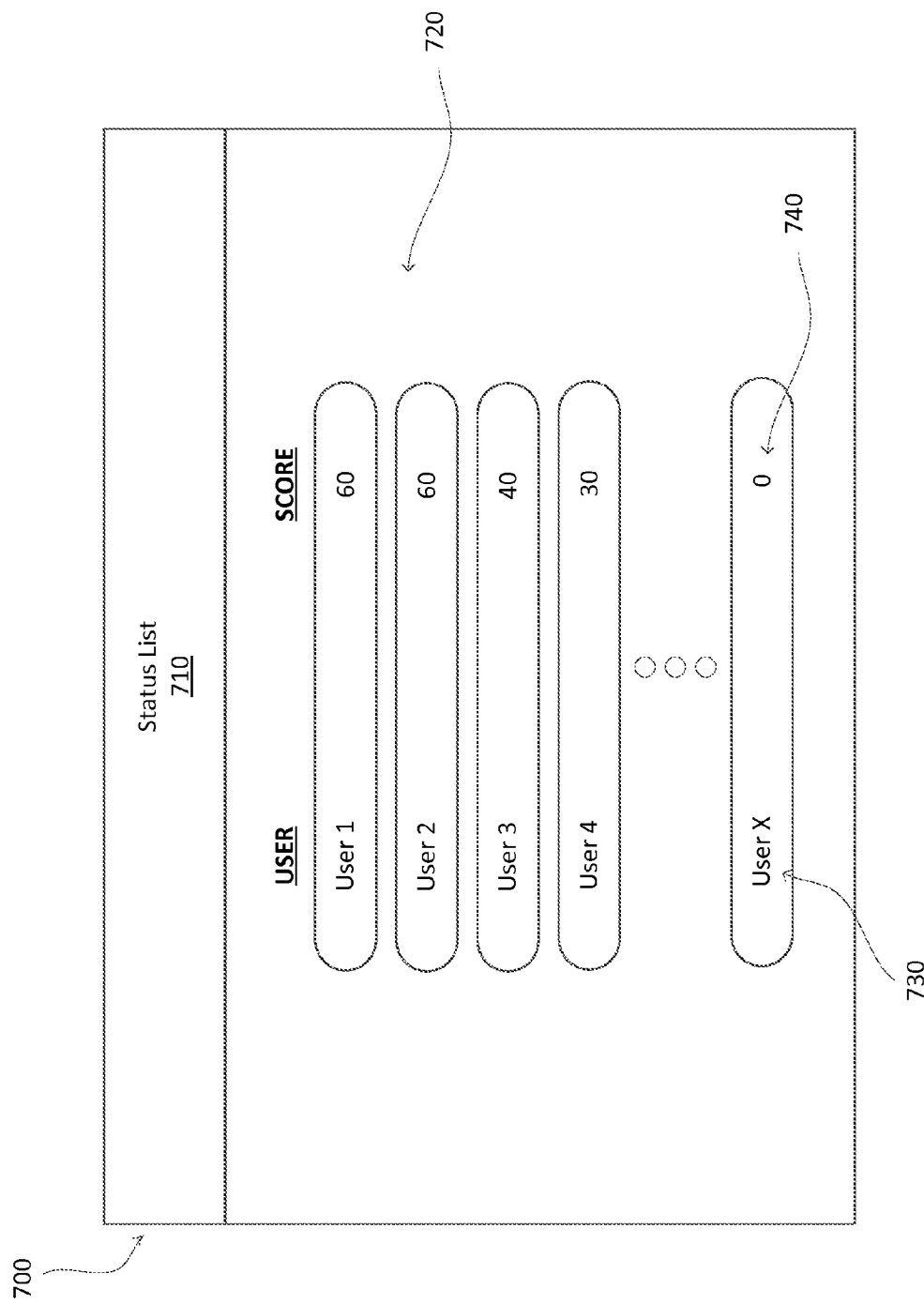
FIG. 7 depicts another example user interface that may be generated for displaying data analysis.

FIG. 7 depicts another example user interface 700 that may be generated for displaying data analysis at a computing device. The data analysis may be generated based on digital messages received from users during a session of the interactive computing environment. The data analysis shown in FIG. 7 is displayed in the form of a status list 710. The status list 710 may be displayed in the user interface 700 to administrative users that define the session parameters and/or other users that may be logged into the session. The status list 710 may include a list of users 720 in ascending or descending order according to their corresponding score 740. For example, the list of users 720 may be a scoreboard or leaderboard that may identify the place of each user at the current time in the session.

Each entry in the list of users 720 may include a user 730 and/or a corresponding user score 740 of the user. The user score 740 for each user may be determined from the total amount of points awarded to the user 730 for completing defined objectives. The entries in the list of users 720 may identify the objectives and/or objective types completed by the user 730 (e.g., including the objective type symbols and/or other distinguishing information for each objective or objective type). The status list 710 may also identify the number of objectives a user 730 has completed (e.g., in a graph or a percentage), a number of objectives to be completed by the user 730, and/or whether the user 730 has completed each of the objectives.

The list of users 720 may identify the rank of each user 730 based on the corresponding user score 740. Each user 730 having the same score 740 may have the same rank. The one or more users having the highest predefined rank in the status list 710 at the end of the session may be issued a reward. The one or more users that complete each of the objectives may receive a reward. Each completed objective may have a corresponding reward that may be generated for the user that completed the objective.

User interfaces provided to the users during the session may be customized by a user, such as the administrative user defining the session parameters for example. Allowing a user to customize user interfaces and session parameters enable a user to provide a customized interactive computing environment to users that are logged in to the session.

Figure 8:
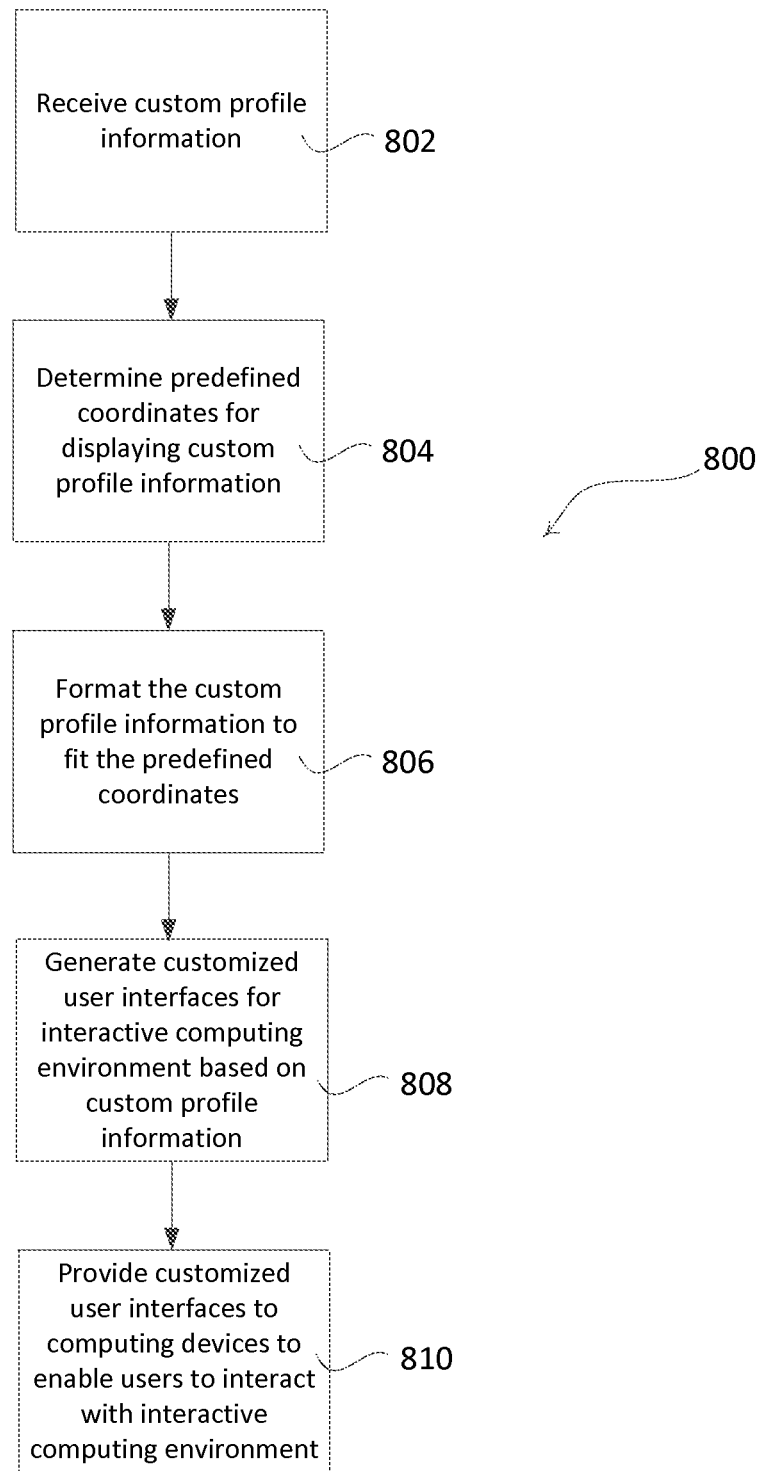
FIG. 8 is a flow diagram illustrating an example method for customizing user interfaces provided to users logged into a session of an interactive computing environment.

FIG. 8 is a flow diagram illustrating an example method 800 for customizing user interfaces provided to users logged into a session of an interactive computing environment provided by a computing device. The method 800, or portions thereof, may be performed at a computing device or may be distributed across multiple computing devices. The method 800, or portions thereof, may be performed to enable users, such as administrative users, to customize the user interfaces provided to other users in the interactive computing environment.

As illustrated in FIG. 8, custom profile information may be received at a computing device at 802. The custom profile information may include the session parameters for defining a session of the interactive computing environment, such that the custom profile information is aware of the session parameters and the space on the display that may be occupied by information defined in the session parameters. The custom profile information may include graphics or text for customizing a user interface for the interactive computing environment. The graphics or text may include an advertisement, such as a logo or an icon, of a company, for example. The graphics or text may be received as a picture file or a link to a picture that may be accessed using a uniform resource locator (URL). The custom profile information may include a URL itself for allowing users to visit the URL while being logged into a session.

At 804, predefined coordinates on the user interface may be determined for displaying the custom profile information. As multiple portions of the user interface may include custom profile information, the predefined coordinates for each location may be determined for displaying corresponding custom profile information. The predefined coordinates may be indicated by a location on in the user interface and/or a size of the user interface allocated for the custom profile information. The size of the predefined coordinates may be identified by a pixel height and/or a pixel width. The custom profile information may be formatted to fit the predefined coordinates at 806. For example, the size of the picture that includes the graphic or text may be resized (e.g., larger or smaller) to fit the predefined coordinates. In another example, the custom profile information may be received at a size that corresponds to the predefined coordinates of the user interface, such that auto-formatting may be prevented.

A computing device may generate the customized user interfaces at 808 based on the custom profile information. The customized user interfaces may include the custom profile information in the predefined coordinates of the user interface. The customized user interfaces may include a predefined area for displaying information defined in the session parameters. The computing device may provide the customized user interfaces to the computing devices of users that are logged into a session at 810. The customized user interfaces may be provided to the users at 810 to enable the users to interact with the interactive computing environment. The customized user interfaces may be provided by being displayed on computing devices (e.g., locally or on a remote computing device) of users that are registered and/or logged into the corresponding session. Different customized profile information may be provided for different sessions.

Figure 9:
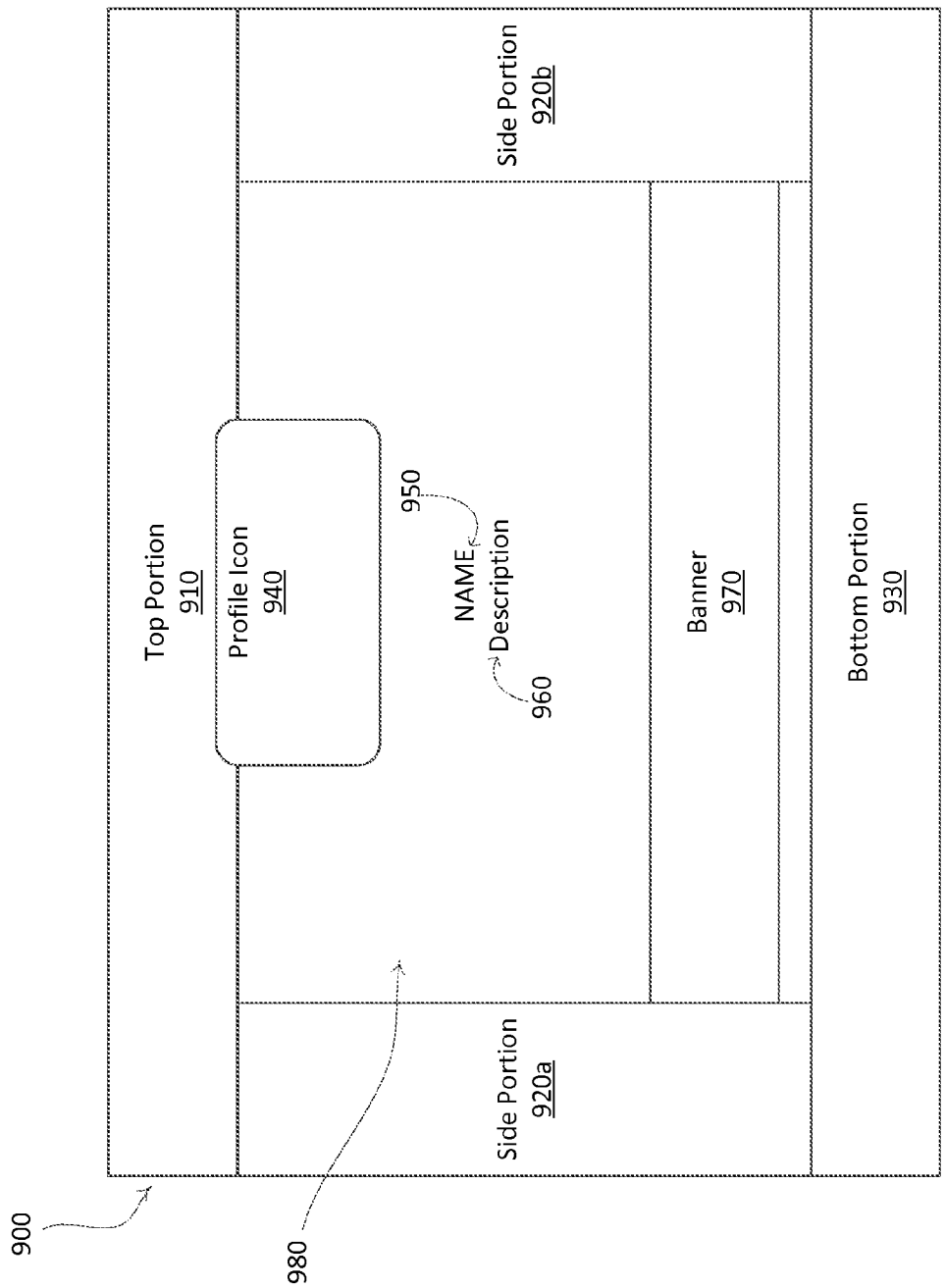
FIG. 9 depicts an example user interface that may be generated to include custom profile information at one or more portions of the user interface.

FIG. 9 depicts an example user interface 900 that may be generated at a computing device to include custom profile information at one or more portions of the user interface 900. The custom profile information, or portions thereof, illustrated in the user interface 900 may be included in any of the user interfaces described herein. The custom profile information illustrated in the user interface 900 may be provided as a home screen to users that register for and/or log into a session. Where the user interface is provided as a home screen, the user interface 900 may include a name 950 and/or a description 960 of the session. The name 950 and/or the description 960 may be scrolled in the viewing pane 980 in a direction (e.g., up, left, right, down) upon receiving an indication (e.g., a gesture or selection) from a user. The viewing pane 980 may display defined session parameters (e.g., customized objectives, user objective completion status, etc.), data analysis, and/or other information to a user. Each portion of the custom profile information may be uploaded and stored for being displayed with a corresponding different portion of the user interface. One or more portions of the user interface 900 (e.g., including the profile icon 940 and/or the banner 970) may continue to be displayed as information is scrolled in the viewing pane 980. One or more portions of the user interface 900 (e.g., including the profile icon 940 and/or the banner 970) may scroll into view or out of view as information is scrolled in the viewing pane 980.

As shown in FIG. 9, the user interface 900 may include a top portion 910; one or more side potions 920*a*, 920*b*; and/or a bottom portion 930 that may include a predefined size for inserting custom profile information, such as graphics, text, or a URL. Each portion 910, 920*a*, 920*b*, and/or 930 may have a similar or different size than other portions. Each of the portions 910, 920*a*, 920*b*, and/or 930 may have the same size in different locations. The top portion 910 and the bottom portion 930 may have the same size in different locations. The side portions 920*a* and 920*b* may have the same size in different locations. The size of each portion may be measured in pixel height and pixel width. For example, the top portion 910 and/or the bottom portion 930 may be 640 pixels in height and 400 pixels in width. The pixel height and width may depend on the type of device on which the user interface 900 is being displayed.

The user interface 900 may include a profile icon 940. The profile icon 940 may be located in a center portion of the user interface 900 for displaying an icon in the center of the user interface 900. The profile icon 940 may include a predefined size for inserting custom profile information, such as a graphics, text, or a URL. The profile icon 940 may have a smaller size than the other portions of the user interface 900. The profile icon may be 120 pixels in height and 120 pixels in width, for example. The pixel height and width may depend on the type of device on which the user interface 900 is being displayed. The profile icon 940 may be layered over one or more other portions (e.g., the top portion 910) such that the profile icon 940 overlays the one or more other portions to be prominently displayed.

The user interface 900 may include one or more banners, such as banner 970, which may be displayed throughout the user interface 900. The banners may appear and disappear as a user scrolls up and down or side to side on the user interface 900 to view additional information. The banner 970 may be located anywhere on the user interface 900. The banner 970 may stretch the width of the user interface 900, or the width of the user interface 900 minus one or more side portions 920*a*, 920*b*. The banner 970 may include a predefined size for inserting custom profile information, such as graphics, text, or a URL. The banner 970 may be 620 pixels in height and 150 pixels in width, for example. The pixel height and width may depend on the type of device on which the user interface 900 is being displayed. The banner 970 may be layered over one or more other portions such that the banner 970 overlays the one or more other portions.

Figure 10:
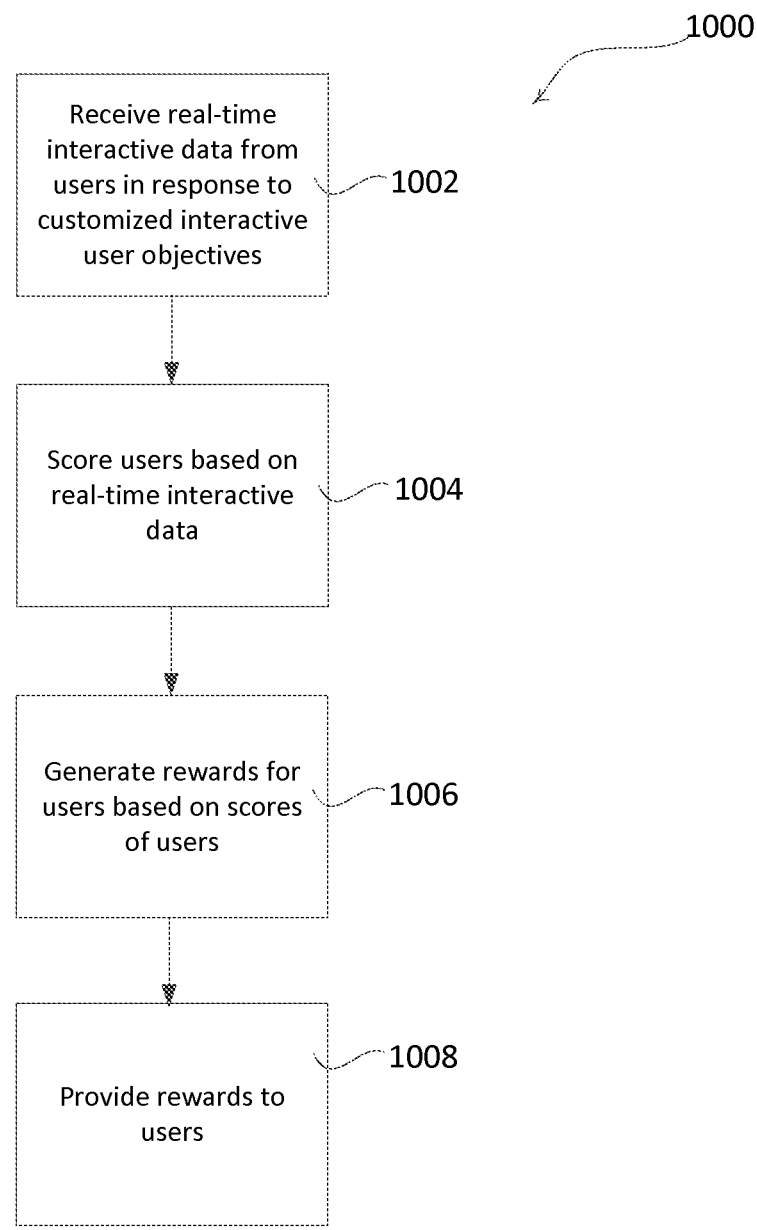
FIG. 10 is a flow diagram illustrating an example method for generating rewards for users.

FIG. 10 is a flow diagram illustrating an example method 1000 for generating rewards for users. The method 1000, or portions thereof, may be performed at a computing device or may be distributed across multiple computing devices. The method 1000, or portions thereof, may be performed to enable administrative users, such as administrative users, to provide rewards to users. The rewards may incentivize users to complete more objectives, complete more difficult or more important objectives for information distribution or gathering, and/or complete objectives in a faster time period, thereby providing more real-time interactive data and/or discovering more information (e.g., about a company or for another theme of the session).

As illustrated in FIG. 10, real-time interactive data may be received from users at 1002 in response to customized interactive user objectives. The real-time interactive data may be received via digital messages that identify the objective and/or the user for which the real-time interactive data is being submitted. At 1004, users may be scored based on the real-time interactive data received from each user. Each user's score may be increased by the amount of points defined for the identified objective.

Rewards may be generated for the users at 1006 based on the user scores. For example, a reward may be generated for a predefined number of users based on the users' scores. The reward maybe predefined in the session parameters. The reward description, definition of users who will receive the reward (e.g., users with the highest score), the time at which the defined users will receive the reward (e.g., at the end of the session, upon completion of one or more corresponding objectives, upon completion of each objective, etc.), and/or the reward may be stored in memory for being provided to users. The reward description may be provided to users when the users register or log into a session. The reward may be generated for one or more users for which the reward has been defined. A reward may be generated for one or more users with the highest score at the end of the session, the users that have completed a one or more corresponding objectives, or the users that have completed each of the objectives. Different rewards may be generated for users with different scores. For example, a different reward may be generated for the users with the top score than the users with the second highest score.

The rewards may be provided in the form of text, a photo or image, a barcode, a QR code, or other format for providing a customized reward to a user on a display of a computing device. The reward may be a coupon, a gift card, a promo code, or other reward that may be redeemed by users. The reward may be a link to a URL that includes a coupon, a gift card, or discounted products.

The reward may be provided, at 1008, to the users having the user identifiers for which the reward was generated. The reward may be provided to the user in a predefined location of the user interface. Each type of reward may be uploaded by a user, such as the administrative user, via a file or URL. The reward may be provided in a predefined size or provided as custom profile information and formatted for being displayed in the user interface as described in the method 800 of FIG. 8. The size of the predefined location for the reward may be a predefined number of pixels. For example, the predefined location for the reward may be 640 pixels by 640 pixels. The pixel height and width may depend on the type of device on which the user interface is being displayed.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:
    receiving session parameters from a computing device associated with an administrative user, wherein the session parameters define a session in which a plurality of users are able to access an interactive computing environment;
    defining interactive user objectives based on the session parameters, wherein the definition of each interactive user objective comprises a respective number of points to be awarded for completion of the interactive user objective;
    receiving custom profile information from the computing device associated with the administrative user, wherein the custom profile information comprises at least one of a graphic or text for customizing at least one user interface for the interactive computing environment;
    generating, based on the custom profile information, the at least one user interface for the interactive computing environment, wherein the at least one user interface comprises the at least one of the graphic or the text in a predefined location, wherein the at least one user interface is generated by determining a predefined pixel size for the predefined location and formatting the custom profile information to fit the predefined pixel size;
    providing the at least one user interface to a plurality of computing devices to enable the plurality of users to access the interactive computing environment during the session;
    receiving, via the at least one user interface, real-time interactive user data from the plurality of users during the session, wherein the real-time interactive user data is received in response to the interactive user objectives;
    awarding, based on the real-time interactive user data, the respective number of points to each user of the plurality of users that completes an interactive user objective;
    generating data analysis indicating a number of the plurality of users that have completed at least one of the interactive user objectives during the session; and
    providing the data analysis to the computing device associated with the administrative user.

2. The method of claim 1, wherein the interactive user objectives comprise a photo objective that indicates a photo to be taken by each user of the plurality of users and the respective number of points for each user of the plurality of users from which the photo is received, and wherein the real-time interactive user data of each user of the plurality of users comprises a respective photo submitted to complete the photo objective.

3. The method of claim 1, wherein the interactive user objectives comprise a location-based objective that indicates a defined location, a defined range associated with the location, and the respective number of points for each user of the plurality of users that submit a geolocation of an associated computing device from within the range associated with the location, and wherein the real-time interactive user data of each user of the plurality of users comprises respective geospatial location information from a user device associated with the user that is submitted to complete the location-based objective.

4. The method of claim 1, wherein the interactive user objectives comprise a QR code objective that indicates a QR code to be scanned by a computing device associated with each user of the plurality of users and the respective number of points for each user of the plurality of users from which the QR code is received, and wherein the real-time interactive user data of each user of the plurality of users comprises a respective QR code from a user device associated with the user that is submitted to complete the QR code objective.

5. The method of claim 1, wherein the interactive user objectives comprise a question and answer objective that indicates the question to be answered by each user of the plurality of users and the respective number of points for each user of the plurality of users from which the answer is received, and wherein the real-time interactive user data of each user of the plurality of users comprises a respective answer submitted to complete the question and answer objective.

6. The method of claim 1, wherein the interactive user objectives comprises a photo objective that indicates a photo to be taken by each user of the plurality of users and the respective number of points for each user of the plurality of users from which the photo is received;
    wherein the interactive user objectives comprises a location-based objective that indicates a defined location, a defined range associated with the location, and the respective number of points for each user of the plurality of users that submit a geolocation of an associated computing device from within the range associated with the location;
    wherein the interactive user objectives comprises a QR code objective that indicates a QR code to be scanned a computing device associated with each user of the plurality of users and the respective number of points for each user of the plurality of users from which the QR code is received; and
    wherein the interactive user objectives comprises a question and answer objective that indicates the question to be answered by each user of the plurality of users and the respective number of points for each user of the plurality of users from which the answer is received.

7. The method of claim 1, wherein the data analysis is provided by being displayed in a graph indicating registration or login information associated with the plurality of users.

8. The method of claim 1, wherein the data analysis is provided by being displayed in a graph indicating objective completion information associated with the plurality of users.

9. The method of claim 1, further comprising:
    generating a reward for display on a computing device; and
    displaying the reward to each user of the plurality of users that complete each of the defined interactive user objectives.

10. A computing device comprising:
    a processor configured to:
    receive session parameters from a computing device associated with an administrative user, wherein the session parameters define a session in which a plurality of users are able to access an interactive computing environment;
    define interactive user objectives based on the session parameters, wherein the definition of each interactive user objective comprises a respective number of points to be awarded for completion of the interactive user objective;

receive custom profile information from the computing device associated with the administrative user, wherein the custom profile information comprises at least one of a graphic or text for customizing at least one user interface for the interactive computing environment;

generate, based on the custom profile information, the at least one user interface for the interactive computing environment, wherein the at least one user interface comprises the at least one of the graphic or the text in a predefined location, and wherein the at least one user interface is generated by determining a predefined pixel size for the predefined location and formatting the custom profile information to fit the predefined pixel size;

provide the at least one user interface to a plurality of computing devices to enable the plurality of users to access the interactive computing environment during the session;

receive, via the at least one user interface, real-time interactive user data from the plurality of users during the session, wherein the real-time interactive user data is received in response to the interactive user objectives;

award, based on the real-time interactive user data, the respective number of points to each user of the plurality of users that completes an interactive user objective;

generate data analysis indicating a number of the plurality of users that have completed at least one of the interactive user objectives during the session; and provide the data analysis to the computing device associated with the administrative user.

11. The computing device of claim 10, wherein the interactive user objectives comprise a photo objective that indicates a photo to be taken by each user of the plurality of users and the respective number of points for each user of the plurality of users from which the photo is received, and wherein the real-time interactive user data of each user of the plurality of users comprises a respective photo submitted to complete the photo objective.

12. The computing device of claim 10, wherein the interactive user objectives comprise a location-based objective that indicates a defined location, a defined range associated with the location, and the respective number of points for each user of the plurality of users that submit a geolocation of an associated computing device from within the range associated with the location, and wherein the real-time interactive user data of each user of the plurality of users comprises respective geospatial location information from a user device associated with the user that is submitted to complete the location-based objective.

13. The computing device of claim 10, wherein the interactive user objectives comprise a QR code objective that indicates a QR code to be scanned by a computing device associated with each user of the plurality of users and the respective number of points for each user of the plurality of users from which the QR code is received, and wherein the real-time interactive user data of each user of the plurality of users comprises a respective QR code from a user device associated with the user that is submitted to complete the QR code objective.

14. The computing device of claim 10, wherein the interactive user objectives comprise a question and answer objective that indicates the question to be answered by each user of the plurality of users and the respective number of points for each user of the plurality of users from which the answer is received, and wherein the real-time interactive user data of each user of the plurality of users comprises a respective answer submitted to complete the question and answer objective.

15. The computing device of claim 10, wherein the interactive user objectives comprises a photo objective that indicates a photo to be taken by each user of the plurality of users and the respective number of points for each user of the plurality of users from which the photo is received;

wherein the interactive user objectives comprises a location-based objective that indicates a defined location, a defined range associated with the location, and the respective number of points for each user of the plurality of users that submit a geolocation of an associated computing device from within the range associated with the location;

wherein the interactive user objectives comprises a QR code objective that indicates a QR code to be scanned a computing device associated with each user of the plurality of users and the respective number of points for each user of the plurality of users from which the QR code is received; and wherein the interactive user objectives comprises a question and answer objective that indicates the question to be answered by each user of the plurality of users and the respective number of points for each user of the plurality of users from which the answer is received.

16. The computing device of claim 10, wherein the processor is configured to provide the data analysis in a graph indicating registration or login information associated with the plurality of users, and wherein the processor is configured to provide the data analysis to a display.

17. The computing device of claim 10, wherein the processor is configured to provide the data analysis in a graph indicating objective completion information associated with the plurality of users, and wherein the processor is configured to provide the data analysis to a display.

18. The computing device of claim 10, wherein the processor is configured to:

generate a reward for display on a computing device; and display, via a display, the reward to each user of the plurality of users that complete each of the defined interactive user objectives.

* * * * *